US006534621B2

(12) United States Patent
Boriack et al.

(10) Patent No.: US 6,534,621 B2
(45) Date of Patent: Mar. 18, 2003

(54) PROCESS FOR MANUFACTURING A HYDROXYESTER DERIVATIVE INTERMEDIATE AND EPOXY RESINS PREPARED THEREFROM

(75) Inventors: Clinton J. Boriack, Jones Creek, TX (US); Zeng K. Liao, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/852,355

(22) Filed: May 9, 2001

(65) Prior Publication Data

US 2002/0045707 A1 Apr. 18, 2002

Related U.S. Application Data

(60) Provisional application No. 60/205,366, filed on May 18, 2000.

(51) Int. Cl.$^7$ .................... C07D 301/24; C08G 59/02
(52) U.S. Cl. .................... 528/87; 525/507; 528/96; 528/99; 549/520
(58) Field of Search ............... 549/520; 528/99, 528/96, 87

(56) References Cited

U.S. PATENT DOCUMENTS

| | | | | |
|---|---|---|---|---|
| 2,144,612 A | 1/1939 | Britton et al. | ............... | 260/633 |
| 2,761,870 A | 9/1956 | Payne et al. | ............... | 260/348 |
| 3,950,400 A | 4/1976 | Fernholz et al. | | |
| 3,965,152 A | 6/1976 | Smith et al. | | |
| 3,965,153 A | 6/1976 | Smith et al. | | |
| 3,970,713 A | 7/1976 | Scharfe et al. | .......... | 260/638 R |
| 4,112,235 A | 9/1978 | Schmerling | .............. | 560/1 |
| 4,215,059 A | 7/1980 | Gipson | .............. | 260/348.29 |
| 4,215,060 A | 7/1980 | Gipson | .............. | 260/348.29 |
| 4,215,061 A | 7/1980 | Gipson | .............. | 260/348.29 |
| 4,499,255 A | 2/1985 | Wang et al. | .............. | 528/95 |
| 4,590,286 A | 5/1986 | Bull | .............. | 549/526 |
| 4,632,971 A | 12/1986 | Cavitt | .............. | 528/88 |
| 4,647,690 A | 3/1987 | Drake | .............. | 560/245 |
| 4,721,798 A | 1/1988 | Mulder | .............. | 549/533 |
| 4,755,542 A | 7/1988 | Cavitt et al. | .............. | 523/172 |
| 4,778,863 A | 10/1988 | Wang et al. | .............. | 525/507 |
| 4,785,061 A | 11/1988 | Wang et al. | .............. | 525/507 |
| 4,808,692 A | 2/1989 | Pham et al. | .............. | 528/89 |
| 5,011,980 A | 4/1991 | Sano et al. | .............. | 560/245 |
| 5,028,686 A | 7/1991 | Liao et al. | .............. | 528/92 |
| 5,466,835 A | 11/1995 | Nemeth et al. | .............. | 549/531 |
| 5,670,674 A | 9/1997 | Grey | .............. | 549/533 |
| 5,684,170 A | 11/1997 | Saxton et al. | .............. | 549/531 |
| 5,780,654 A | 7/1998 | Nemeth et al. | .............. | 549/531 |
| 6,001,945 A | 12/1999 | Decker et al. | .............. | 528/26 |

FOREIGN PATENT DOCUMENTS

| | | |
|---|---|---|
| DE | 2057087 | 6/1972 |
| DE | 2504230 | 8/1975 |
| DE | 2504231 | 8/1975 |
| DE | 3323329 | 1/1985 |
| EP | 0 360 195 A2 | 3/1990 |
| GB | 1 517 908 | 7/1978 |
| JP | 43-27849 | 11/1968 |
| WO | WO 98/00415 | 1/1998 |
| WO | WO 98/33786 | 8/1998 |
| WO | WO 99/00188 | 1/1999 |
| WO | WO 99/52883 | 10/1999 |
| WO | WO 99/62894 | 12/1999 |

OTHER PUBLICATIONS

Bohlmann, et al., "Five Germacronolides from *Gochnatia Discoidea*," Phytochemistry, vol. 20, pp. 109–112 (1981).

Bohlmann, et al., Chem. Ber., vol. 88, pp. 1869–1876 (1955).

Brink, et al., "Selenium catalysed oxidations with aqueous hydrogen peroxide. Part 1: epoxidation reactions in homogeneous solution," J. Chem. Soc., Perkin Trans. 1, pp. 224–228 (2001).

Derwent Abstract, Oxirane Production from olefinic compounds—by reaction with cyclohexanone peroxide using supported titanium dioxide catalyst, Europe 0 129 814 A1 (1985).

Derwent Abstract, "Carboxylic acid esters," France 1,563,259.

Derwent Abstract, "Methallyl acetate preparation," Germany 1,964,085.

Derwent Abstract, "Unsatd. ester(s) preparation—by oxidising fraction by–produced in cracking of naptha in presence of lower fatty acid catalyst containing lead, platinum or rhodium cpd.," Japan 53127409 A.

Derwent Abstract, "Carboxylic acid aryl ester production for use e.g. as perfume—by reacting alkali metal salt of carboxylic acid with halogenated aryl cpd. in presence of crown ether," Japan 53,108,914.

Derwent Abstract, "Methallyl acetate production—by reacting isobutylene with oxygen and acetic acid in presence of catalyst containing palladium and lanthanum gp. metal(s)," Japan 57–131741.

Derwent Abstract, "Epoxidising–olefin cpds. with hydrogen peroxide—in presence of catalyst containing aryl selenic acid or aryl selenide and organic carboxylic acid," Japan 59–76077.

Derwent Abstract, "Epoxy alcohol preparation—by oxidising allyl alcohol with organic hydroperoxide in presence of vanadium–porphyrin complex," Japan 60–190774.

(List continued on next page.)

*Primary Examiner*—Robert E.L. Sellers

(57) ABSTRACT

A process for manufacturing an α-halohydrin intermediate and an epoxy resin prepared therefrom including epoxidizing an α-halohydrin intermediate produced from an in situ halide substitution-deesterification of an α-hydroxy ester derivative which has been obtained by the coupling reaction of a phenol or a mixture of phenols and a glycidyl ester optionally in the presence of a catalyst.

52 Claims, No Drawings

OTHER PUBLICATIONS

DeVos, et al., "Epoxidation of Terminal or Electron–deficient Olefins with $H_2O_2$, catalysed by Mn–trimethyltriazacyclonane Complexes in the Presence of an Oxalate Buffer," Tetrahedron Letters, vol. 39, pp. 3221–3224 (1998).

Fort, et al., "Synthesis of Epoxy (Meth)acrylic Esters by Selective Epoxidation of Unsaturated (Meth)acrylic Esters using the System $H_2O_2$—$Na_2WO_4$ under Phase Transfer Catalysis," Tetrahedron, vol. 48, No. 24, pp. 5099–5110 (1992).

Foucaud, et al., "One–pot Preparation of 1–Acyl–1–methoxycarbonyloxiranes and 1–Acyl–1– cyanooxiranes from Methyl 3–Hydroxy–2– methylenealkanoates or 3–Aryl–3–hydroxy–2– methylenepropanenitriles," Synthesis, vol. 9, pp. 787–789 (1990).

Hassan, et al., "Studies Directed toward the Synthesis of Phomenoic Acid—Enantioselective synthesis of the C(1)–to–C(6) Segment," Helvetica Chimica Acta, vol. 77, pp. 838–849 (1994).

Hoshi, et al., "A Total Synthesis of 6,7–Dihydroeponemycin and Determination of Stereochemistry of the Epoxide Ring," Tetrahedron Letters, vol. 34, No. 6, pp. 1047–1050 (1993).

Kawaki, et al., "Reactions of Cuprous Acetate with Organic Halides," Bulletin of the Chemical Society of Japan, vol. 45, pp. 3130–3132 (1972).

Kleeman, et al., "Stability of Glycidol," Glycidol Properties, Reactions, Applications, pp. 48–52 (1981).

Lee and Neville, "Diglycidyl Ether of Bisphenol A (DGEBA)," Handbook of Epoxy Resins (Reissue), pp. 2–3–2–4 (1982).

Mallavarapu, et al., "Ferric Chloride—A Catalyst for Esterification of Carboxylic Acids," Indian J. Chem., vol. 16B, pp. 725–726 (1978).

March, "Aliphatic Nucleophilic Substitution," Advanced Organic Chemistry, $3^{rd}$ Edition, pp. 346–347, (1985).

Martinez, et al., "Synthesis and Isomerization of 1–Alken–3–yl Acetates and 2–Alken–1–yl Acetates," Synthesis, vol. 1, pp. 125–128 (1986)—summary only.

Moffett, et al., "Reaction of Peracids with $\Delta^{20(21)}$–Steroid Enol Acetates," Journal of the American Chemical Society, vol. 76, No. 14, pp. 3678–3681 (1954).

Murray, "Dioxiranes," Chem. Rev., vol. 89, pp. 1187–1201 (1989).

Murray, et al., "Olefin Epoxidations Using the Dicyclohexylcarbodiimide–$H_2O_2$ System," J. Org. Chem., vol. 63, pp. 1730–1731 (1998).

Nair, et al., "Novel Synthesis and Enzymatic Resolution of (±)–2,3–Epoxy Propyl Esters," Synthetic Communications, vol. 29, No. 15, pp. 2559–2566 (1999).

Nakashima, et al., "Structure Elucidation of AK–Toxins, Host–specifc Phytotoxic metabolites produced by *Alternaria Kikuchiana* Tanaka," Tetrahedron Letters, vol. 23, No. 43, pp. 4469–4472 (1982).

Ohtake, et al., "The Selectivities and the Mechanism on Highly Efficient Epoxidation of Olefins with 2,6–Disubstituted Pyridine N–Oxides Catalyzed by Ruthenium Porphyrin," Tetrahedron Letters, vol. 33, No. 18, pp. 2521–2524 (1992).

van Vliet, "Perfluoroheptadecan–9–one: a selective and reusable catalyst for epoxidations with hydrogen peroxide," Chem. Commun., pp. 263–264 (1999).

Zondler, et al., "Thallium compounds as catalysts for transesterifications and ester exchange reactions," Helvetica Chimica Acta, vol. 60, No. 6, pp. 1845–1860 (1977).

PROCESS FOR MANUFACTURING A HYDROXYESTER DERIVATIVE INTERMEDIATE AND EPOXY RESINS PREPARED THEREFROM

This application claims the benefit of provisional application 60/205,366 filed May 18, 2000.

BACKGROUND OF THE INVENTION

The present invention relates to a process for manufacturing an α-halohydrin ester derivative of at least one or more phenols and converting such α-halohydrin ester derivative to an epoxy resin.

More specifically, the present invention relates to a process for manufacturing an α-halohydrin derivative and at least one or more phenols, converting such α-halohydrin ester derivative to an α-halohydrin intermediate of at least one or more phenols and utilizing such α-halohydrin intermediate of the at least one or more phenols to make an epoxy resin. For example, the present invention is useful for manufacturing bisphenol A (bis A) epoxy resin.

α-Halohydrins are made, as reactive intermediates, via several processes which are well known to those skilled in the art. Generally, the intermediate α-halohydrins are subsequently converted into epoxides. In one widely practiced process, α-halohydrins are made by reacting low molecular weight olefin-containing compounds such as propylene, butylene and allyl chloride, with halogens, such as chlorine or bromine, in water. The α-halohydrins, more specifically the α-chlorohydrins, from propylene, butylene and allyl chloride are subsequently used for manufacturing propylene oxide, butylene oxide and epichlorohydrin (ECH) respectively, in large scale. The process chemistries for the industrial processes of propylene oxide and ECH are outlined in the following reaction sequences, Reaction Sequence (I) and Reaction Sequence (II). More specifically, Reaction Sequence (I) shows a process chemistry scheme for industrial production of propylene oxide from chlorohydrins made via chlorine in water route; and Reaction Sequence (II) shows a process chemistry scheme for industrial production of epichlorohydrin from chlorohydrins made via chlorine in water route.

Reaction Sequence (I)

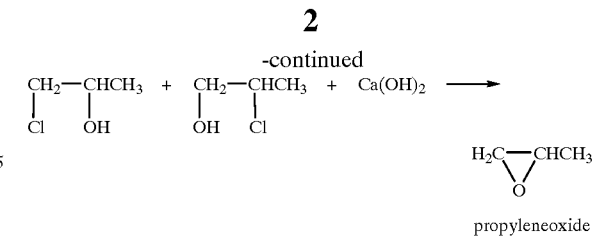

Reaction Sequence (II)

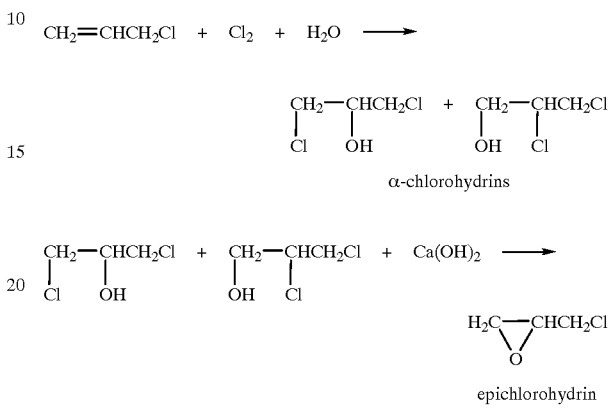

In a well-known industrial process for producing epoxy resins on a large commercial scale, in a first step, an α-halohydrin, as a reactive intermediate, is made by reacting an active hydrogen-containing compound such as an alcohol, a phenol, a carboxylic acid or an amine with an epihalohydrin, such as epichlorohydrin (ECH) or epibromohydrin. Then, in a second step, the α-halohydrin intermediate is converted into a glycidyl ether, glycidyl ester, or glycidyl amine under basic reaction conditions.

The most widely made and particularly useful epoxy resin is bisphenol A (bis A) epoxy resin which is made by the coupling reaction of bis A and ECH to form the bis(α-chlorohydrin) intermediate in a first step. Then, in an epoxide ring-forming dehydrochlorination reaction with base, as a second step, the bis A bis(α-chlorohydrin) intermediate is converted to the bis A diglycidyl ether epoxy resin. Such a two-step process for making an epoxy resin is described by H. Lee and K. Neville in "Handbook of Epoxy Resins", McGraw-Hill Book Co., New York, New York, 1982, Reissue, 2-3 to 2-4. This process is shown in the following reaction sequence, Reaction Sequence (III). More specifically, Reaction Sequence (III) shows a process chemistry scheme for a two-step, industrial manufacture of bis A epoxy resin via the reaction of bis A and ECH to make a chlorohydrin intermediate.

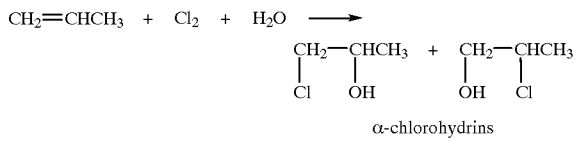

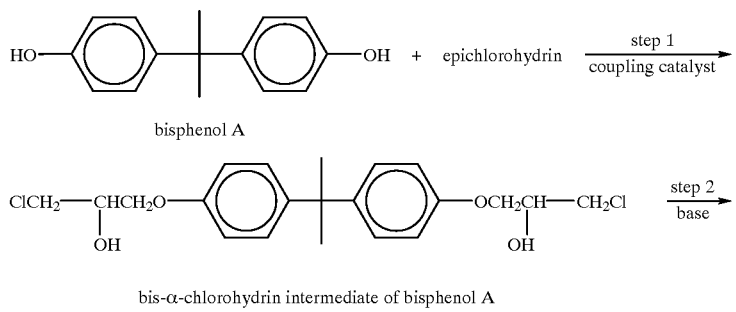

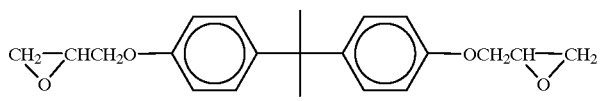

bisdiglycidyl ether of bisphenol A (bis A epoxy resin)

The above two-step process of coupling bis A and ECH followed by epoxide ring forming dehydrochlorination has also been combined into a single-step reaction, wherein the bis(α-chlorohydrin) intermediate of bis A is generated in situ and converted into an epoxy simultaneously. Such a single-step process for making bis A epoxy resin is described in U.S. Pat. Nos. 4,499,255; 4,778,863; and 5,028,686.

Another method to generate α-chlorohydrins, as reactive intermeditates, is described in U.S. Pat. No. 2,144,612 in which glycerol, which is an α-glycol, is converted into an α-chlorohydrin by reaction with anhydrous hydrogen chloride (HCl) in the presence of a catalytic amount of acetic acid (AcOH). U.S. Pat. No. 2,144,612 describes a process that is shown in the following reaction sequence, Reaction Sequence (IV), for making glycerol dichlorohydrin, a precursor for epichlorohydrin from the α-glycol glycerol. More specifically, Reaction Sequence (IV) shows chemistry for epichlorohydrin synthesis via the reaction of glycerol with HCl and AcOH to make glycerol dichlorohydrin.

Reaction Sequence (IV)

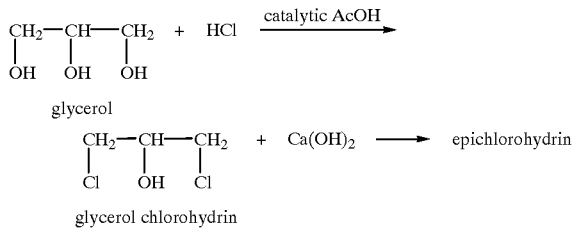

Although epichlorohydrin (ECH) is an important commercial product for making α-chlorohydrin intermediates, and particularly for making the bis A bis α-chlorohydrin intermediate precursors of bis A epoxy resin, ECH provides a chlorine-intensive route to producing epoxy resins. In the predominate commercial process for making ECH, ECH is made from allyl chloride, which in turn, is made from thermal chlorination of propylene using chlorine gas, a process that produces chlorinated by-products. Generally, chlorinated by-products are treated as waste material.

Additionally, a large amount of water is used when converting allyl chloride into an α-chlorohydrin intermediate, and this water must eventually also be treated as waste. Therefore, from an environmental standpoint, there is a desire to reduce the consumption of chlorine and to reduce the generation of chlorinated by-products and waste water in the production of epoxy resin.

In addition, epoxy resins made from ECH by either of the previously described two-step or single-step processes, may have a high organic chloride content which may be deemed as undesirable in some applications, for example, in electronic applications.

It is therefore desired to provide a non-epichlorohydrin process for making epoxy resins such as bis A epoxy resin. That is, it is desired to provide an alternative epoxy resin route, i.e., an alternative process without using ECH for manufacturing epoxy resins.

One non-epichlorohydrin process for manufacturing epoxy resins is described in U.S. Pat. No. 6,001,945. In the process of U.S. Pat. No. 6,001,945, glycidol is used as a reactant to produce an α-glycol derivative, which is subsequently converted to an α-chlorohydrin via reaction with hydrogen chloride and a catalytic amount of acetic acid via the process described in U.S. Pat. No. 2,144,612. Glycidol is known to be a highly toxic and thermally unstable material tending to explosively self-polymerize. At low temperatures, such as 70° C., glycidol is unstable and the loss of epoxide content of glycidol is significant. Glycidol self-polymerization diminishes glycidol selectivity and product yield in its reactions, and the glycidol self-polymerization products complicate separation and purification of the desired reaction product. These undesirable properties of glycidol are described in detail by A. Kleemann and R. Wagner in "Glycidol Properties, Reactions, Applications", Dr. Alfred Huthig Verlag, New York, New York, 1981, pp. 48–52. Thus, it is desirable to develop processes that can manufacture α-halohydrin intermediates as precursors for manufacturing epoxy resins that do not require glycidol as a reactant.

SUMMARY OF THE INVENTION

One aspect of the present invention is directed to a process for making an epoxy resin by converting an α-halohydrin ester derivative of a phenol or mixture of phenols to an epoxy resin.

Another aspect of the present invention is directed to a process for manufacturing an α-halohydrin intermediate of at least one or more phenols using an in situ halide substitution-deesterification process to convert an α-hydroxy ester derivative of at least one or more phenols to the α-halohydrin intermediate. The process is preferably carried out under anhydrous conditions with an anhydrous hydrogen halide such as hydrogen chloride, hydrogen bromide, or hydrogen iodide, as a reactant; and optionally, the process is carried out in the presence of a solvent.

Yet another aspect of the present invention is directed to an alternative, non-epichlorohydrin process for manufacturing an epoxy resin of at least one or more phenols utilizing, as an intermediate product, the α-halohydrin intermediate of at least one or more phenols as described above.

Still another aspect of the present invention is directed to the α-hydroxy ester derivative of at least one or more phenols used in the above process for making the α-halohydrin intermediates preferably prepared by reacting at least one phenol or a mixture of two or more phenols with a glycidyl ester, preferably glycidyl acetate. The process for manufacturing the α-hydroxy ester derivative of at least one or more phenols is preferably carried out in the presence of a solvent and a catalyst.

DETAILED DESCRIPTION OF THE PREFERRED EMBODIMENT(S)

The present invention involves a novel process for manufacturing a phenolic-based α-halohydrin intermediate, i.e., an α-halohydrin intermediate made from one phenol or a mixture of α-halohydrin intermediates made from a mixture of two or more different phenols from a phenolic based α-halohydrin ester derivative. The α-halohydrin intermediates are then used to make epoxy resins.

α-Halohydrin Intermediates

Generally, the process of the present invention for manufacturing the α-halohydrin intermediates includes converting an α-hydroxy ester derivative of at least one or more phenols to the α-halohydrin intermediate by an in situ halide substitution-deesterification process using a hydrogen halide. Then, the α-halohydrin intermediates can be used to make epoxy resins by well-known techniques in the industry, such as, for example, by a ring-closing epoxidation reaction of the α-halohydrin intermediates with a base. More preferably, the epoxy resins which can be prepared by the process of the present invention include, for example, bisphenol A (bis A) diglycidyl ether epoxy resin.

The α-halohydrin intermediates prepared in accordance with the process of the present invention are represented for example by, but not limited to, the structures of the following Formulas I–V. A preferred class of α-halohydrin intermediates in the present invention is generically represented for example by the following Formula I:

$(R^2)_y Ar(OR^1)_z$  Formula I

In Formula I, y is from 0 to 750, and z is from 1 to 150.

In Formula I, Ar is a moiety containing a mononuclear aromatic ring such as phenyl. Ar may also be a moiety containing multinuclear aromatic rings, such as biphenyl, 2,2-diphenyl propane, bisphenylene oxide, 1,1,2,2-tetrakisphenylethane, stilbene, phenol-formaldehyde novolac, cresol-formaldehyde novolac, phenol-dicyclopentadiene novolac and hyper-branched aromatic phenol dendrimers. Ar may also be a moiety containing multinuclear fused aromatic rings such as naphthalene, anthracene and naphthalene-formaldehyde novolac. Ar may also be a moiety containing multinuclear fused aromatic rings with one or more heteroatoms such as O, N, S, Si, B or P, or any combination of these heteroatoms, for example, quinoxaline, thiophene and quinoline. Ar may also be a moiety containing mononuclear or multinuclear aromatic ring(s) fused with a cycloaliphatic ring(s) such as indane, 1,2,3,4-tetrahydronaphthalene and fluorene. Ar may also be a moiety containing mononuclear or multinuclear aromatic ring(s) fused with a cycloaliphatic ring(s) containing one or more heteroatoms such as O, N, S, Si, B or P, or any combination of these heteroatoms, for example, chroman, indoline and thioindane.

In Formula I, Ar can also be a moiety containing aryl groups in which each aryl group is connected to oligomeric (for example, polymers with less than about 5000 molecular weight average) or high molecular weight (for example, greater than about 5000 molecular weight average) organosiloxane units. The aryl groups are attached directly to the silicon atoms of the organosiloxane units, or the aryl groups are indirectly attached to the silicon atoms of the organosiloxane units via an organic aliphatic moiety, organic cycloaliphatic moiety, organic aromatic moiety or any combination thereof. The organic aliphatic, cycloaliphatic or aromatic moiety should contain no more than about 20 carbon atoms. When the Ar moiety contains such oligomeric or high molecular weight organosiloxane units, then z is preferably from 1 to 150.

In Formula I, O is an oxygen atom substituted for a hydrogen atom on the aromatic ring(s) of the Ar moiety, and $R^1$ is an α-halohydrin propyl-containing moiety preferably selected from:

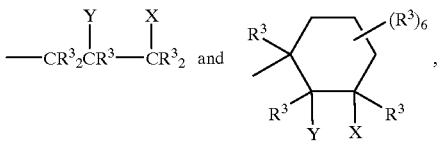

where X is a halogen atom such as chlorine, bromine or iodine; and Y is a hydroxyl group. The positions of X and Y may be interchanged. $R^3$ in Formula I is preferably hydrogen; an alkyl group having from 1 to 20 carbon atoms such as methyl, ethyl and propyl; a cycloaliphatic group having from 3 to 20 carbon atoms such as cyclopentyl and cyclohexyl; an aromatic group having from 6 to 20 carbon atoms such as phenyl and naphthyl; or any combination thereof. Each individual R may be the same group or may be a different group from each other.

In one embodiment, when $R^1$ in Formula I above is the following structure:

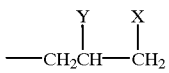

the α-halohydrin is a 3-halo-2-hydroxy-1-propyl moiety-containing derivative or in such derivative, the hydroxy and halo groups may be interchanged to form a 2-halo-3-hydroxy-1-propyl moiety-containing derivative.

In another embodiment, when $R^1$ in Formula I above is the following structure:

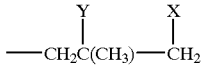

the α-halohydrin is a 3-halo-2-hydroxy-2-methyl-1-propyl moiety-containing derivative or in such derivative, the hydroxy and halo groups may be interchanged to form a 2-halo-3-hydroxy-2-methyl-1-propyl moiety-containing derivative.

In yet another embodiment, when $R^1$ in Formula I above is the following structure:

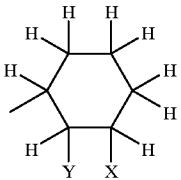

the α-halohydrin is a 3-halo-2-hydroxy-1-cyclohexyl moiety-containing derivative, or in such derivative, the hydroxy and halo groups may be interchanged to form a 2-halo-3-hydroxy-1-cyclohexyl moiety-containing derivative. In both derivatives, the propyl moiety is contained in the cyclohexyl ring structure.

In Formula I, $R^2$ is a group substituted for a hydrogen atom on the aromatic ring(s) of the Ar moiety. $R^2$ may be a halogen such as chlorine, bromine, iodine or fluorine; or a hydrocarbon radical such as an alkyl group, a cycloaliphatic group or an aromatic group. $R^2$ is preferably an alkyl group having from 1 to 20 carbon atoms such as methyl, ethyl and propyl; a cycloaliphatic group having from 3 to 20 carbon atoms such as cyclopentyl and cyclohexyl; an aromatic group having from 6 to 20 carbon atoms such as phenyl and naphthyl; or any combination thereof. The hydrocarbon radicals above may also contain one or more heteroatoms such as O, N, S, Si, B or P, or any combination of these heteroatoms. An example of a hydrocarbon radical containing an oxygen heteroatom is a methoxy group, an ethoxy group or a polyalkylene oxide group derived from alkylene oxides such as ethylene oxide, propylene oxide, butylene oxide and cyclohexene oxide. $R^2$ as described above in Formula I can be partially or fully fluorinated.

More specific and preferred examples of α-halohydrin intermediates useful in the present invention are represented by Formulas II–V separately or as mixtures of two or more α-halohydrin intermediates of Formulas II–V which follow.

Examples of mononuclear aromatic α-halohydrin intermediates useful in the present invention are represented for example by the following Formula II:

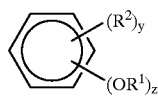

Formula II

In Formula II, y is from 0 to 5 and z is from 1 to 4. In Formula II, O, $R^1$ and $R^2$ have the same meaning as described above with reference to Formula I. α-Halohydrin intermediates of Formula II can be prepared from aromatic hydroxyl group-containing precursors, such as, for example, 2-methylphenol; 4-methylphenol; 4-methoxyphenol; 2,6-dimethylphenol; 2,6-diisopropylphenol; 2,6-dibromophenol; 1,2-dihydroxybenzene; 1,3-dihyroxybenzene; 1,4-dihydroxybenzene; and mixtures thereof.

Other examples of α-halohydrin intermediates useful in the present invention are binuclear aromatic α-halohydrin intermediates which are represented, for example, by the following Formula III:

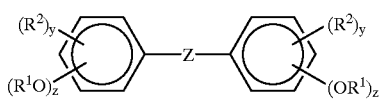

Formula III

In Formula III, each y is from 0 to 4, and each y can be the same or different, and each z is from 1 to 3, and each z can be the same or different. In Formula III, O, $R^1$ and $R^2$ have the same meaning as described above with reference to Formula I.

In Formula III, Z may be nil; or Z can be a heteroatom with or without substituents thereon to complete its necessary bonding valence. The heteroatom is selected from O, N, S, Si, B or P, or any combination of two or more of the above heteroatoms. Z can also be, for example, —C(O)—; —S(O$_2$)—; —C(O)NH—; —P(O)Ar—; an organic aliphatic moiety, saturated or unsaturated, with or without heteroatoms, such as, for example, oxydimethylene, methylene, 2,2-isopropylidene, isobutylene and —CR$^3$═CH—, where $R^3$ is as defined with reference to Formula I above; a cycloaliphatic group, saturated or unsaturated, with or without heteroatoms, such as, for example, a cycloaliphatic ring with greater than 3 carbon atoms; an aromatic group, with or without heteroatoms; or any combination thereof. Z as described above in Formula III can be partially or fully fluorinated, such as, for example, 2,2-perfluoroiso-propylidene.

Precursors useful for making the α-halohydrin intermediates of Formula III include, for example, 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl)methane; bis(4-hydroxyphenyl)sulfone; 2,2-bis(3,5-dibromo-4-hydroxyphenyl)isopropylidene; 2,2-bis(4-hydroxyphenyl)isopropylidene; bisphenol K; 9,9-bis(4-hydroxyphenyl)fluorene; 4,4'-dihydroxy-α-methylstilbene; 1,3-bis(4-hydroxylphenyl)adamantane; and mixtures thereof.

Other examples of α-halohydrin intermediates useful in the present invention are multinuclear aromatic α-halohydrin intermediates which are represented, for example, by the following Formula IV:

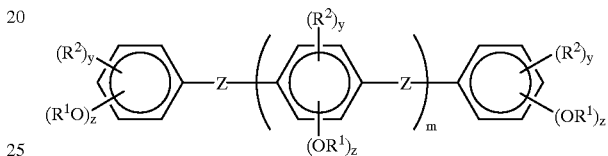

Formula IV

In Formula IV, each y, each z and Z are the same as has been previously described above in Formula III. In Formula IV, m is from 0.001 to 10. In Formula IV, O, $R^1$ and $R^2$ have the same meaning as described above with reference to Formula I.

Precursors useful for making the α-halohydrin intermediates of Formula IV include, for example, phenol-formaldehyde novolac (functionality greater than 2); o-cresol-formaldehyde novolac (functionality greater than 2); phenol-dicyclopentadienyl novolac (functionality greater than 2); naphthol-formaldehyde novolac (functionality greater than 2); and mixtures thereof.

Other examples of α-halohydrin intermediates useful in the present invention are multi-nuclear aromatic α-halohydrin intermediates which are represented, for example, by the following Formula V:

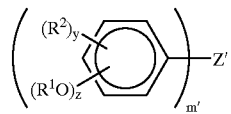

Formula V

In Formula V, each y and each z are the same as has been previously described above in Formula III. In Formula V, O, $R^1$ and $R^2$ have the same meaning as described previously with reference to Formula I.

In Formula V, Z' is an organic aliphatic moiety, saturated or unsaturated, with or without heteroatoms such as O, N, S, Si, B or P, or any combination of two or more of the above heteroatoms, wherein the aliphatic moiety has from 1 to 20 carbon atoms, such as, for example, methine; a cycloaliphatic moiety, saturated or unsaturated, with or without heteroatoms, having from 3 to 20 carbon atoms, such as, for example, cyclohexane tri-yl; an aromatic moiety, with or without heteroatoms, such as, for example, benzenetriyl, naphthylenetriyl and fluorenetriyl; or any combination thereof. Z' preferably contains no more than about 20 carbon atoms. Z' as described above in Formula V can be partially or fully fluorinated, such as, fluoromethine.

In Formula V, m' is generally 3 or 4. However, Z' may also be an oligomeric (for example, less than about 5000 molecular weight average) organosiloxane unit or high molecular weight (for example, greater than about 5000 molecular weight average) organosiloxane unit; in which case, the aryl groups are attached to the silicon atoms of the organosiloxane unit directly or through an organic aliphatic, cycloaliphatic or aromatic group; or any combination thereof, with no more than about 20 carbon atoms. When Z' is an oligomeric or high molecular weight organosiloxane unit, m' in Formula V is preferably from 1 to 150.

Precursors useful for making the α-halohydrin intermediates of Formula V include, for example, tris(4-hydroxyphenyl)methane; 1,1,1-tris(3,5-dimethyl-4-hydroxyphenyl)methane; 1,1,2,2-tetrakis(4-hydroxyphenyl) ethane; and mixtures thereof.

Preferably, the α-halohydrin intermediates of the present invention, include for example, the phenolic α-chlorohydrin intermediates made from phenols, such as 1,3-dihydroxybenzene; 1,4-dihydroxybenzene; 1,5-dihydroxynaphthalene; 2,6-dihydroxynaphthalene; 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl)methane; 2,2-bis(4-hydroxyphenyl) isopropylidene; phenol-formaldehyde novolac (functionality >2); o-cresol-formaldehyde novolac (functionality >2); phenol-dicyclopentadienyl novolac (functionality >2); naphthol-formaldehyde novolac (functionality >2); 1,1,1-tris(4-hydroxyphenyl)methane; 1,1,2,2-tetrakis(4-hydroxyphenyl) ethane; and mixtures thereof.

Preferably, the α-halohydrin intermediates of the present invention, include for example, phenolic α-chlorohydrin intermediates, such as, 1,3-dihydroxybenzene bis(3-chloro-2-hydroxypropyl) ether; 1,4-dihydroxybenzene bis(3-chloro-2-hydroxypropyl) ether; 1,5-dihydroxynaphthalene-bis(3-chloro-2-hydroxypropyl) ether; 2,6-dihydroxynaphthalene bis(3-chloro-2-hydroxypropyl) ether; 4,4'-dihydroxybiphenyl bis(3-chloro-2-hydroxypropyl) ether; 3,3',5,5'-tetramethyl-4,4'-dihydroxybiphenyl bis(3-chloro-2-hydroxypropyl) ether; 3,3',5,5'-tetramethyl-2,2',6,6'-tetrabromo-4,4'-dihydroxybiphenyl bis(3-chloro-2-hydroxypropyl) ether; bis(4-hydroxyphenyl)methane bis(3-chloro-2-hydroxypropyl) ether; 2,2-bis(4-hydroxyphenyl) isopropylidene bis(3-chloro-2-hydroxypropyl) ether; phenol-formaldehyde novolac (3-chloro-2-hydroxypropyl) ether (functionality >2); o-cresol-formaldehyde novolac (3-chloro-2-hydroxypropyl) ether (functionality >2); phenol-dicyclopentadienyl novolac (3-chloro-2-hydroxypropyl) ether (functionality >2); naphthol-formaldehyde novolac (3-chloro-2-hydroxypropyl) ether (functionality >2); 1,1,1-tris(4-hydroxyphenyl)methane tris (3-chloro-2-hydroxypropyl) ether; 1,1,2,2-tetrakis(4-hydroxyphenyl)ethane tetrakis(3-chloro-2-hydroxypropyl) ether; and mixtures thereof.

In addition, the chloro and hydroxyl groups in the above 3-chloro-2-hydroxyl-1-propyl moiety-containing derivatives may be interchanged to form 3-hydroxy-2-chloro-1-propyl moiety-containing derivatives.

The α-halohydrin intermediates of the present invention comprise from about 10 to about 100 percent, more preferably from about 25 to about 100 percent, most preferably from about 50 to about 100 percent, of the total weight of one or more than one component as illustrated in the above Formulas I-V.

The α-halohydrin intermediates of the present invention, for example as illustrated in the above Formulas I–V, are prepared by first obtaining an α-hydroxy ester derivative of at least one or more phenols and then converting the α-hydroxy ester derivative to the α-halohydrin intermediate using an in situ halide substitution-deesterification process. More particularly, the α-halohydrin intermediates of the present invention are prepared by reacting (A) an α-hydroxy ester derivative of at least one or more phenols with (B) a hydrogen halide and optionally in the presence of (C) a solvent.

The halogen halide, Component (B), useful in the manufacturing the α-halohydrin intermediates of the present invention may include, for example, hydrogen chloride, hydrogen bromide and hydrogen iodide.

The amount of hydrogen halide, Component (B), useful in manufacturing the α-halohydrin intermediates of the present invention should be sufficient to ensure substantially complete conversion of the α-hydroxy ester derivative to the α-halohydrin intermediate. The amount of hydrogen halide used is generally from about 0.50 mole to about 20 moles of hydrogen halide relative to the equivalents of α-hydroxy ester moieties being reacted in the α-hydroxy ester derivative; preferably from about 0.75 mole to about 10 moles of hydrogen halide relative to the equivalents of α-hydroxy ester moieties being reacted in the α-hydroxy ester derivative; and more preferably from about 0.95 mole to about 5 moles of hydrogen halide relative to the equivalents of α-hydroxy ester moieties being reacted in the α-hydroxy ester derivative.

The hydrogen halide may be added neat to the reaction as a liquid or as a gas. When added to the reaction as a gas, the hydrogen halide may be added as a continuous stream of gas. The hydrogen halide may also be dissolved in a solvent, such as those described in reference to Component (C) below, and added to the reactor as a solution. When an amount of halogen halide in excess of the stoichiometric amount necessary to ensure complete conversion of the of α-hydroxy ester derivative is used, the excess amount may be removed from the reaction mixture by washing with water or careful neutralization with base. It is preferred to recover and recycle the excess hydrogen halide by distilling the hydrogen halide from the reaction mixture.

The solvent, optional Component (C), which may be used in the above process for making the α-halohydrin intermediate may be, but is not limited to, aliphatic and cyclic hydrocarbons such as pentane, hexane, octane, iso-octane, cyclohexane and cyclooctane; aromatic hydrocarbons such as benzene, toluene and xylene; chlorinated solvents such as methylene dichloride, tetrachloroethane and chlorobenzene; aprotic solvents such as acetone, methyl iso-butyl ketone, acetonitrile, dimethoxyethane, 2,2'-dimethoxy diethyl ether, dioxane, dimethyl sulfoxide and 1-methoxy-2-acetoxypropane; protic solvents such as ethanol, 1-propanol, isopropyl alcohol, 1-butanol, 2-butanol, tert-butanol, 1-pentanol, tert-amyl alcohol, 1-hexanol, cyclohexanol and 1-methoxy-2-hydroxypropane; partially or fully fluorinated derivatives thereof; and any combination thereof. Optionally, the solvent may be used with or without the presence of water.

When protic alcohol solvents are optionally used, it is preferred that the alcohol solvents are secondary or tertiary alcoholic solvents, such as isopropyl alcohol, 2-butanol, tert-butanol, tert-amyl alcohol and 1-methoxy-2-hydroxypropane; partially or fully fluorinated derivatives thereof; and any combination thereof.

In general, the amount of the solvent, optional Component (C), used in the present invention may be a ratio of from about 0 to about 50 parts (on a weight basis) of a single solvent or a mixture of two or more solvents to 1 part α-hydroxy ester derivative. A more preferred solvent to α-hydroxy ester derivative ratio is from about 0 to about 10 parts solvent per 1 part α-hydroxy ester derivative. The most preferred solvent to α-hydroxy ester derivative ratio is from about 0 to about 5 parts solvent per 1 part α-hydroxy ester derivative.

The temperature in the above reaction for in situ halide substitution-deesterification of the α-hydroxy ester derivative is generally from about 0° C. to about 150° C.; preferably from about 20° C. to about 130° C.; and more preferably from about 40° C. to about 110° C. At a temperature below 0° C., the reaction is not complete. At a temperature above about 150° C., undesirable chlorination reactions may take place.

The pressure used in the above reaction process for in situ halide substitution-deesterification of the α-hydroxy ester derivative for manufacturing the α-chlorohydrin intermediate may be atmospheric, subatmospheric or superatmospheric. The pressure is not critical and may be determined by parameters such as type of hydrogen halide used, reaction temperature, type of solvent used or the solvent azeotrope boiling points.

The in situ halide substitution-deesterifiction of α-hydroxy ester derivative to make the α-halohydrin intermediate can be carried out in a batch or in a continuous reaction mode. In a batch reaction, the α-hydroxy ester derivative is optionally dissolved in the solvent and the hydrogen halide is added to the reactor as previously described above. In a batch process, it is highly desirable to run the reaction under pressure to maintain the hydrogen halide in the solution phase. When the batch reaction using hydrogen halide in solution phase is completed, the excess hydrogen halide and the carboxylic acid produced by deesterification may be removed from the reaction mixture by washing with water or by careful neutralization with base. Or, the excess hydrogen halide and the carboxylic acid may be recovered and recycled as described below.

In some instances, for example when using hydrogen chloride gas, it may be beneficial to purge the gas continuously through a reactor while efficiently mixing or agitating the reaction mixture in the reactor. In this process, the hydrogen chloride gas exiting the reactor is collected and recycled to the reactor.

In a continuous halide substitution-deesterification process, the α-hydroxy ester derivative can optionally be mixed with a solvent and then intimately mixed with hydrogen halide as the α-hydroxy ester derivative and optionally solvent is fed into a reactor. The reactors which may be used are well known in the art, for example, the reactor may be of a tubular design. After the reaction product leaves the reactor, the reaction product may pass through a series of purification steps. For example, in one embodiment when a solvent is used that boils at a lower temperature than the carboxylic acid produced, the reaction product may be: first, distilled to remove excess hydrogen halide where the hydrogen halide may then be recycled to the halide substitution-deesterification reactor; second, distilled to remove the solvent, wherein the solvent may then be recycled to a halide substitution-deesterification unit; and third, distilled to remove the carboxylic acid product of the deesterification wherein the carboxylic acid product may then be recycled to an allyl ester process.

In another second embodiment, when a solvent is used that boils at a higher temperature than the carboxylic acid produced, the reaction product may be: first, distilled to remove the hydrogen halide wherein the hydrogen halide may then be recycled to the halide substitution-deesterification reactor; and second, distilled to remove the carboxylic acid product of the deesterification. In the second embodiment above, the solvent may optionally be removed for example by distillation, or the solvent need not be removed, wherein the solvent is carried forward as a solvent for subsequent epoxidation step. The distillation steps described above may be carried out at atmospheric pressure, under subatmospheric pressure or under superatmospheric pressure as is well known in the art.

It is highly desirable and preferred to carry out the above processes whereby the α-halohydrin intermediate can be converted to the epoxy resin without additional purification.

The halide substitution-deesterification of the α-hydroxy ester derivative to make the α-halohydrin intermediate of this invention is illustrated by the following reaction sequence, Reaction Sequence (V) which shows the chloride substitution-deacetyloxylation of an α-hydroxy acetate derivative. More specifically, Reaction Sequence (V) shows the chloride substitution-deacetyloxylation of an α-hydroxy acetate derivative to synthesize an α-chlorohydrin intermediate of the present invention.

Reaction Sequence (V)

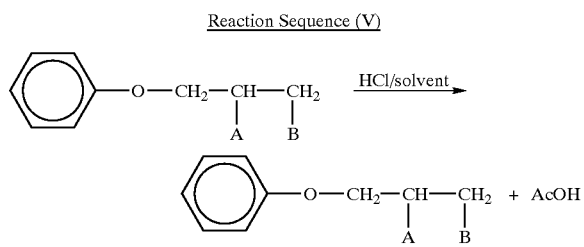

In the above Reaction Sequence V, A may be OH and B may be OAc; or A may be OAc and B may be OH.

α-Hydroxy Ester Derivatives

The α-hydroxy ester derivatives, Component (A), useful the present invention are represented for example by, but not limited to, the structures of the following Formulas VI–X. A preferred class of α-hydroxy ester derivatives used in the present invention to make α-halohydrin intermediates is generically represented for example by the following Formula VI:

$(R^2)_y Ar(OR^{1'})_z$          Formula VI

In Formula VI, y, z Ar, O and $R^2$ are as defined previously for Formula I.

In Formula VI, $R^{1'}$ is an α-hydroxy ester propyl-containing moiety preferably selected from:

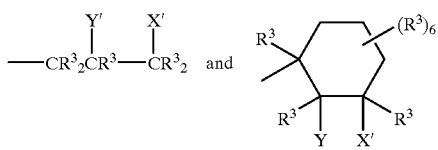

wherein $R^3$ is as defined previously for Formula I, Y' is a hydroxyl group and X' is a carboxy or carboxylic acid ester moiety having the following general structure:

wherein R⁴ is hydrogen; an alkyl group having from 1 to 20 carbon atoms such as methyl, ethyl and propyl; an alkenyl group having from 2 to 20 carbon atoms such as ethenyl, propenyl and methyl propenyl; a cycloaliphatic group having from 3 to 20 carbon atoms such as cyclopentyl and cyclohexyl; or an aromatic group having from 6 to 20 carbon atoms such as phenyl and naphthyl. R⁴ is preferably a methyl group.

The positions of X' and Y' may be interchanged.

In one embodiment, when $R^{1'}$ in Formula VI above is for example:

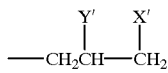

the α-hydroxy ester derivative is a 3-carboxy-2-hydroxy-1-propyl moiety-containing component or in such component, the hydroxy and ester (i.e., carboxy) groups may be interchanged to form a 2-carboxy-3-hydroxy-1-propyl moiety-containing component.

In another embodiment, when $R^{1'}$ is for example:

in Formula VI above, the α-hydroxy ester derivative is a 3-carboxy-2-hydroxy-2-methyl-1-propyl moiety-containing component or in such component, the hydroxy and ester groups may be interchanged to form a 2-carboxy-3-hydroxy-2-methyl-1-propyl-containing component.

In yet another embodiment, when $R^{1'}$ in Formula VI above is for example:

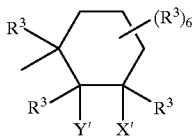

the α-hydroxy ester derivative is a 3-carboxy-2-hydroxy-1-cyclohexyl moiety-containing component or, in such component, the hydroxy and ester groups may be interchanged to form a 2-carboxy-3-hydroxy-1-cyclohexyl moiety-containing component. In both derivatives, the propyl moiety is contained in the cyclohexyl ring structure.

More specific and preferred examples of α-hydroxy ester derivatives useful in the present invention are represented by Formulas VII–X separately or as mixtures of two or more α-hydroxy ester derivatives of Formulas VII–X which follow.

Examples of mononuclear aromatic α-hydroxy ester derivatives useful in the present invention are represented by the following Formula VII:

Formula VII

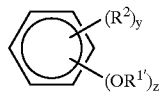

In Formula VII, y, z, O and R² have the same meaning as described above with reference to Formula II. In Formula VII, $R^{1'}$ has the same meaning as described above with reference to Formula VI. α-Hydroxy ester derivatives of Formula VII compound, can be prepared from aromatic hydroxyl group-containing precursors, such as, for example, 2-methylphenol; 4-methylphenol; 4-methoxyphenol; 2,6-dimethylphenol; 2,6-diisopropylphenol; 2,6-dibromophenol; 1,2-dihydroxybenzene; 1,3-dihyroxybenzene; 1,4-dihydroxybenzene; and mixtures thereof.

Other examples of α-hydroxy ester derivatives useful in the present invention are binuclear aromatic α-hydroxy ester derivatives which are represented by the following Formula VIII:

Formula VIII

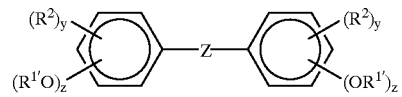

In Formula VIII, y, z, Z, O and R² have the same meaning as described above with reference to Formula III. In Formula VIII, $R^{1'}$ has the same meaning as described above with reference to Formula VI.

Precursors useful for making the α-hydroxy ester derivatives of Formula VIII include, for example, 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl)methane; bis(4-hydroxyphenyl)sulfone; 2,2-bis(3,5-dibromo-4-hydroxyphenyl)isopropylidene; 2,2-bis(4-hydroxyphenyl)isopropylidene; bisphenol K; 9,9-bis(4-hydroxyphenyl)fluorene; 4,4'-dihydroxy-α-methylstilbene; 1,3-bis(4-hydroxylphenyl)adamantane; and mixtures thereof.

Other examples of α-hydroxy ester derivatives useful in the present invention are multi-nuclear aromatic α-hydroxy ester derivatives which are represented by the following Formula IX:

Formula IX

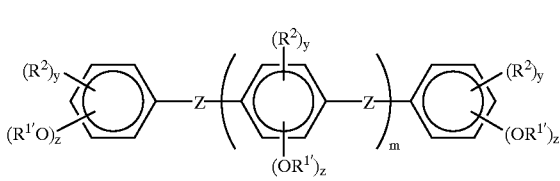

In Formula IX, y, z, Z, m, O and R² are as described above for Formula IV. In Formula IX, R¹ has the same meaning as described above with reference to Formula VI.

Precursors useful for making the α-hydroxy ester derivatives of Formula IX include, for example, phenol-formaldehyde novolac (functionality greater than 2); o-cresol-formaldehyde novolac (functionality greater than 2); phenol-dicyclopentadienyl novolac (functionality greater than 2); naphthol-formaldehyde novolac (functionality greater than 2); and mixtures thereof.

Other examples of α-hydroxy ester derivatives useful in the present invention are multi-nuclear aromatic α-hydroxy ester derivatives which are represented by the following Formula X:

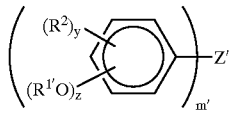

Formula X

In Formula X, y, z, Z' m', O and $R^2$ are the same as previously described above for Formula V. In Formula X, $R^{1'}$ has the same meaning as described previously with reference to Formula VI.

Precursors useful for making the α-hydroxy ester derivatives of Formula V include, for example, tris(4-hydroxyphenyl)methane; 1,1,1-tris(3,5-dimethyl-4-hydroxyphenyl)methane; 1,1,2,2-tetrakis(4-hydroxyphenyl) ethane; and mixtures thereof.

The preferred α-hydroxy ester derivatives useful in the present invention include, more specifically, the phenolic α-hydroxy ester derivatives made from phenols, such as 1,3-dihydroxybenzene; 1,4-dihydroxybenzene; 1,5-dihydroxynaphthalene; 2,6-dihydroxynaphthalene; 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl) methane; 2,2-bis(4-hydroxyphenyl)isopropylidene; phenol-formaldehyde novolac (functionality >2); o-cresol-formaldehyde novolac (functionality >2); phenol-dicyclopentadienyl novolac (functionality >2); naphthol-formaldehyde novolac (functionality >2); 1,1,1-tris(4-hydroxyphenyl)methane; 1,1,2,2-tetrakis(4-hydroxyphenyl) ethane; and mixtures thereof.

The α-hydroxy ester derivatives of phenols or mixtures of phenols of the present invention, include more specifically, the phenolic α-hydroxy ester derivatives, such as, 1,3-dihydroxybenzene bis(3-acetoxy-2-hydroxypropyl) ether; 1,4-dihydroxybenzene bis(3-acetoxy-2-hydroxypropyl) ether; 1,5-dihydroxynaphthalene bis(3-acetoxy-2-hydroxypropyl) ether; 2,6-dihydroxynaphthalene bis(3-acetoxy-2-hydroxypropyl) ether; 4,4'-dihydroxybiphenyl bis(3-acetoxy-2-hydroxypropyl) ether; 3,3',5,5'-tetramethyl-4, 4'-dihydroxybiphenyl bis(3-acetoxy-2-hydroxypropyl) ether; 3,3',5,5'-tetramethyl-2,2',6,6'-tetrabromo-4,4'-dihydroxybiphenyl bis(3-acetoxy-2-hydroxypropyl) ether; bis(4-hydroxyphenyl)methane bis(3-acetoxy-2-hydroxypropyl) ether; 2,2-bis(4-hydroxyphenyl) isopropylidene bis(3-acetoxy-2-hydroxypropyl) ether; phenol-formaldehyde novolac (3-acetoxy-2-hydroxypropyl) ether (functionality >2); o-cresol-formaldehyde novolac (3-acetoxy-2-hydroxypropyl) ether (functionality >2); phenol-dicyclopentadienyl novolac (3-acetoxy-2-hydroxypropyl) ether (functionality >2); naphthol-formaldehyde novolac (3-acetoxy-2-hydroxypropyl) ether (functionality >2); 1,1,1-tris(4-hydroxyphenyl)methane tris (3-acetoxy-2-hydroxypropyl) ether; 1,1,2,2-tetrakis(4-hydroxyphenyl)ethane tetrakis (3-acetoxy-2-hydroxypropyl) ether; and mixtures thereof.

Moreover, in the above-preferred structures, the acetoxy and hydroxy groups in the above 3-acetoxy-2-hydroxyl-1-propyl moiety-containing derivatives may be interchanged to form 3-hydroxy-2-acetoxy-1-propyl moiety-containing derivatives.

In one preferred embodiment, the α-hydroxy ester derivative, Component (A) above, useful in the present invention may be obtained by reacting a glycidyl ester (D) with at least one or more phenolic compounds (E) in the presence of a catalyst (F) and optionally in the presence of a solvent (G).

The catalyst, Component (F), may be used in the above process to cause the coupling reaction of the glycidyl ester Component (D) and the at least one or more phenolic compounds Component (E). The catalyst, Component (F), may be selected from any of the catalysts generally known as phase transfer catalysts. The phase transfer catalysts may be homogenous or heterogeneous.

The catalysts useful for the coupling reaction of glycidyl esters and phenols of the present invention may be for example, the hydroxides of Group Ia (new IUPAC periodic table notation) alkali metals, such as $Na^+$, $K^+$ or $Cs^+$; or of Group IIa alkaline earth metals, such as $Mg^{2+}$ or $Ca^{2+}$; or of Group 11b metals, such as $Zn^{2+}$, or of Group IIIa metals, such as $Al^{3+}$. Examples of the catalyst include sodium hydroxide and potassium hydroxide.

Also, the catalysts useful in the present invention may be, for example, the inorganic or organic acid salts of Group Ia alkali metals, such as $Na^+$, $K^+$ or $Cs^+$; or of Group IIa alkaline earth metals, such as $Mg^{2+}$ or $Ca^{2+}$; or of Group IIb metals, such as $Zn^2$, or Group IIIa metals, such as $Al^{3+}$. The inorganic or organic acids include, for example, but are not limited to, acetic acid; trifluoro acetic acid; phosphoric acid; silicic acid; or their derivatives; and the like. Examples of the catalysts include sodium acetate, sodium phosphate and sodium silicate. Optionally, co-catalysts such as linear polyalkylene oxide ethers or macrocyclic ethers, for example, but not limited to, crown ethers, can be used in combination with the above-mentioned catalysts in order to enhance the catalytic reactivity.

The catalysts, Component (F), useful for coupling in the present invention may be the compounds containing organopnicogen cations. The organopnicogen cation is comprised of at least one pnicogen, that is an element of Group IVa and at least one organic substituent bonded to the pnicogen atom. The anionic counter ions of such organopnicogen cations may be for example, hydroxides; halides, such as chloride and bromide; bisulfates; carbonates; acetates; phosphonates; and silanolates.

More specifically, the organopnicogen-containing catalysts useful for coupling in the present invention are comprised of at least one or more quaternary cationic centers, consisting of nitrogen, phosphorous, arsenic, antimony or bismuth, with one or more organic substituents bound to each quaternary cationic center. The organic substituents may be hydrocarbons containing from 1 to 20 carbon atoms selected from linear, branched or cyclic aliphatic hydrocarbons or aromatic hydrocarbons; with or without heteroatoms, such as N, P, S, O and Si; or halide atoms, such as F, Cl, Br and I; or a combination thereof.

Examples of nitrogen-containing quaternary cationic centers having a single cationic center useful for homogenous coupling catalysts of the present invention are tetramethylammonium, tetraethylammonium, tetraisopropylammonium, tetrabutylammmonium, tetraisobutylammonium, tetrahexylammonium, tetraoctylammonium, tetraisooctylammonium, tetraphenylammonium, benzyltrimethylammonium, benzyltriethylammonium, benzyltrihexylammonium, benzyltrioctylammonium, methyltrioctylammonium, decyltrimetylammonium, tetradodecylammonium, hexadecyltrimethylammonium, ethanoltrimethylammonium, ethanoltriethylammonium, trimethoxysilylpropyltributylammonium, triethoxysilylpropyltributylammonium, trimethoxysilylpropyltrimethylammonium, trimethoxysilylpropyltriethylammonium, octadecyldimethyltrimethoxysilylpropylammonium, tetradecyldimethyl(3-trimethoxysilylpropyl)ammonium and the like.

Examples of nitrogen-containing quaternary cationic centers having more than one cationic center useful for homogenous coupling catalysts of the present invention are, for example, hexamethylethylenediammonium, hexaethylethylenedia monium, hexamethylpropylenediammonium, hexaethylpropylenediammonium and the like.

Examples of phosphorous-containing quaternary cationic centers having only a single cationic center useful for homogenous coupling catalysts of the present invention are tetramethylphosphonium, tetraethylphosphonium, tetrapropylphosphonium, tetraisopropylphosphonium, tetrabutylphosphonium, tetraisobutylphosphonium, tetraheptylphosphonium, tetraphenylphosphonium, benzyltrimethylphosphonium, benzyltriethylphosphonium, ethyltriphenylphosphonium, ethyltritolylphosphonium, cyclohexyltriphenylphosphonium, 2-chloroethyltriphenylphosphonium, butyltriphenylphosphonium, tetrabenzylphosphonium, allyltrimethylphosphonium, allyltriphenylphosphonium, trimethylsilylethoxyethyltriphenylphosphonium and the like. Examples of such phosphonium phenolic-epoxy coupling catalysts are disclosed in U.S. Pat. Nos. 4,808,692; 4,755,542 and 4,632,971; and in European Patent Application 360195 A2, all of which are incorporated herein by reference.

The homogenous catalysts useful for the coupling reaction of the present invention may include any combination of the nitrogen-containing quaternary cationic centers, any combination of the phosphorous-containing quaternary cationic centers or any combination of the nitrogen-containing quaternary cationic centers and the phosphorous-containing quaternary cationic centers described above.

The active moiety of coupling catalysts may be part of an organic, inorganic or hybrid organic-inorganic oligomeric or polymeric structure.

When an organic, inorganic or hybrid organic-inorganic oligomeric or polymeric structure contains more than one hydrocarbon substituent containing 1–20 carbon atoms selected from linear, branched or cyclic aliphatic or aromatic substituents, with or without heteroatoms, such as N, P, S, O and Si; or halide atoms, such as F, Cl, Br and I, or the combination thereof; and such hydrocarbon substituents are pendant to the oligomeric or polymeric backbone and bound to a quaternary cationic center, the organic, inorganic or hybrid organic-inorganic oligomeric or polymeric structure may be linked with more than one anionic counter ion. In this instance, the coupling catalysts are anchored to the organic, inorganic, or hybrid organic-inorganic polymeric support to form a heterogeneous coupling catalyst. An example of such a quaternary, cationic center-containing hydrocarbon substituent on a polymeric support is the benzyltrimethylammonium group formed when cross-linked polystyrene is chloromethylated and then aminated with trimethyl amine. Another example of a hydrocarbon substituent bound to a quaternary cationic center and pendant to a polymeric backbone is the benzyltrimethylammonium group formed when cross-linked polyvinylbenzylchloride is aminated with trimethyl amine.

When trimethoxysilyl- or triethoxysilyl-containing cationic centers such as for example trimethoxysilylpropyltributylammonium, triethoxysilylpropyltributylammonium, trimethoxysilylpropyltrimethylammonium, trimethoxysilylpropyltriethylammonium, trimethoxysilylpropyloctadecyldimethylammonium, tetradecyldimethyltrimethoxysilylpropylammonium, trimethylsilylethoxyethyltriphenylphosphonium, and the like and any mixture thereof are condensed with a monosilane, such as dimethyldiethoxysilane, diethydiethoxysilane, methyltriethoxysilane, ethyltriethoxysilane, tetraisopropoxy silane, tetraethoxy silane and the like, and any mixture thereof; or condensed with a linear, cyclic, branched or ladder-type siloxane having hydroxyl or hydroxyl-equivalent functional groups, such as methoxy, ethoxy, isopropoxy and tert-butoxy; or condensed with a three-dimensional silsesquioxane, precondensed siloxane sol-gel, a silicate or a zeolite, having hydroxyl or hydroxyl-equivalent functional groups, such as methoxy, ethoxy, isopropoxy and tert-butoxy, then a sol-gel, silicate or zeolite having multi-quaternary ammonium or quaternary phosphonium cationic centers is formed. In such instances, the quaternary cationic centers are anchored or tethered to the sol-gel, silicate or zeolite.

The silicate and zeolite solid support materials useful in the present invention are, for example, those with microcrystalline structure having high surface area or those having a pore structure with pore size larger than standard molecular sieves such as a 4A type. The silicates and zeolites having large pore size are for example, TS-1, TS-2, ZSM-5, ZSM-11, ZSM-12, ZSM-22, AZM-48, AlPO4-5, AlPO4-11, zeolite X, zeolite Y, Linde type L, VPI-5, NCL-1, MCM-41 and MCM-48.

The amount of catalyst, Component (F), useful in the above process for making the α-hydroxy ester derivatives of the present invention is from about 0.001% to about 1000% by weight based on the amount of the phenol or mixture of phenols used in the reaction. When the catalyst is a homogeneous catalyst, the amount of catalyst useful in the above process for making the α-hydroxy ester derivatives of the present invention is preferably from about 0.001% to about 10% by weight based on the amount of the phenol or mixture of phenols used in the reaction, more preferably from about 0.001% to about 5% by weight based on the amount of the phenol or mixture of phenols used in the reaction and most preferably from about 0.001% to about 2% by weight based on the amount of the phenol or mixture of phenols used in the reaction.

When the catalyst is a heterogeneous catalyst, the amount of catalyst used in the above process for making the α-hydroxy ester derivatives of the present invention is preferably from about 1% to about 50% by weight based on the amount of the phenol or mixture of phenols used in the reaction, more preferably from about 1% to about 200% by weight based on the amount of the phenol or mixture of phenols used in the reaction and most preferably from about 1% to about 1000% by weight based on the amount of the phenol or mixture of phenols used in the reaction. Larger amounts of heterogeneous catalyst than amounts of homogeneous catalyst can be used because the solid-phase heterogeneous catalysts are easily recovered by decantation or filtration; or the heterogeneous catalyst is contained in a reactor while reactants and solvent flow over the catalyst.

In general, the amount of reactant glycidyl ester, Component (D), useful in the present invention may be in a ratio of from about 0.5 equivalents to about 50 equivalents of glycidyl ester per one equivalent of phenolic hydroxyl. A more preferred ratio of glycidyl ester to phenolic hydroxyl useful in the present invention is from about 0.75 equivalents to about 20 equivalents of glycidyl ester per one equivalent of phenolic hydroxyl. The most preferred ratio of glycidyl ester to phenolic hydroxyl useful in the present invention is from about 0.9 equivalents to about 10 equivalents of glycidyl ester per one equivalent phenolic hydroxyl.

The solvent, Component (G), useful in the present invention may be the same as the solvent, Component (C), in addition, the solvent may include water and the glycidyl ester, Component (D). When the amount of glycidyl ester reacted with the phenolic compound(s) in a coupling reaction is in excess, for example, when the amount of reactant glycidyl ester used in the present invention is about 1.25 or greater equivalents per equivalent of phenolic hydroxyl, then the amount of excess glycidyl ester may act as a solvent.

Preferably, solvent, Component (G), useful in the present invention includes, for example, protic solvents that are secondary or tertiary alcoholic solvents such as isopropyl alcohol, 2-butanol, tert-butanol, tert-amyl alcohol and 1-methoxy-2-hydroxypropane; partially or fully fluorinated derivatives thereof; and any combination thereof.

The above preferred solvents, Component (G), may be used in combination with water, aliphatic and cyclic hydrocarbons, aromatic hydrocarbons, chlorinated solvents, non-polar aprotic solvents or any combination thereof.

When water is used in combination with other solvents, the ratio of solvent or mixture of solvents to water is generally about 1 part (on a weight basis) solvent to 1 part water. Preferably, the ratio of solvent to water is from about 1 to about 100 parts solvent per 1 part water. Most preferably, the ratio of solvent to water is from about 1 to about 500 parts solvent per 1 part water.

In general, the amount of solvent, Component (G), used in the present invention may be a ratio of from about 0 to about 50 parts (on a weight basis) of a single solvent or a mixture of two or more solvents per 1 part phenol or mixture of phenols used in the reaction. A more preferred ratio of solvent to phenol or mixture of phenols is from about 0 to about 10 parts solvent per 1 part phenol or mixture of phenols used in the reaction. The most preferred ratio of solvent to phenol or mixture of phenols is from about 0 to about 5 parts solvent per 1 part phenol or mixture of phenols used in the reaction.

The temperature useful in the above process for making the α-hydroxy ester derivatives by reacting a phenolic compound or a mixture of two or more phenolic compounds with a glycidyl ester is generally from about 10° C. to about 160° C., preferably from about 25° C. to about 135° C. and most preferably from about 50° C. to about 110° C. At a temperature lower than 10° C., the coupling reaction of the phenolic compound with the glycidyl ester is not complete. At a temperature greater than 160° C., the coupling reaction of phenolic compound and glycidyl ester is not selective for the α-hydroxy ester derivative, and the decomposition of glycidyl ester can occur through several pathways leading to lower yields of desired α-hydroxy ester derivative.

The pressure useful in the above process for making the α-hydroxy ester derivative may be atmospheric, subatmospheric or superatmospheric. The pressure is not critical and may be determined by various parameters such as reaction temperature, type of solvent used or the solvent azeotrope boiling points.

In the coupling reaction, it is desired that the conversion of phenolic hydroxyl of a phenol or mixture of phenols to the α-hydroxy ester derivative is greater than 50%. It is more preferred that the conversion of phenolic hydroxyl of a phenol or mixture of phenols to the α-hydroxy ester derivative is greater than 65%. It is most preferred that the conversion of phenolic hydroxyl of a phenol or mixture of phenols to the α-hydroxy ester derivative is greater than 85%. The overall conversion of phenolic hydroxyl to α-hydroxy ester derivative can be controlled by the reaction temperature, reaction time, the amount of glycidyl ester used as reactant and by the type and amount of the catalyst used.

When unreacted phenolic hydroxyl groups remain after the coupling reaction between glycidyl ester and a phenol or a mixture of phenols, the phenolic hydroxyl groups may further react via two different reactions during the overall process of the present invention. In a first reaction, the unreacted phenolic hydroxyl groups may continue to react with glycidyl ester to make α-hydroxy ester during the recovery of the glycidyl ester. This first reaction may occur after the coupling reaction in the overall process of the present invention when the coupling reaction product is subjected to elevated temperatures required to recover excess glycidyl ester as described below.

Additionally, in a second reaction, the unreacted phenolic hydroxyl groups may react with epoxy resins during the epoxidation stage of the overall process of the present invention to make epoxy resins. When the unreacted phenolic hydroxyl groups react with the epoxy resins in this manner, the molecular weight of the epoxy resin increases, and therefore, the epoxy equivalent weight (EEW) of the epoxy resin decreases. In some instances, it may be desirable to control the EEW of the epoxy resin by the above reaction of unreacted phenolic hydroxyl groups and epoxy resins.

In the coupling reaction, it is additionally desired that the self-polymerization of the glycidyl ester, Component (D), such as glycidyl acetate, is limited to a minimum amount so yields of the α-hydroxy ester derivative may be maximized. The self-polymerization of glycidyl esters occurs when the epoxide groups on different molecules of the glycidyl ester react with one another to form a polyol having carboxylic acid ester moieties pendant to the polyol backbone.

When the catalyst used in the above process for making the α-hydroxy ester derivative of the present invention is a homogeneous catalyst, the reaction may be carried out using equipment well known in the art such as a batch reactor, a continuous stirred tank reactor or a continuous reactor.

When the catalyst used in the above process for making the α-hydroxy ester derivatives of the present invention is a heterogeneous catalyst, the reaction may be carried out using equipment well known in the art such as a batch reactor, a continuous stirred tank reactor or a fixed-bed or fluidized-bed continuous reactor.

In the above process for making the α-hydroxy ester derivatives of the present invention, the reaction product from the reactors described above may be further processed by techniques well know to those skilled in the art.

In one preferred embodiment of the present invention, the solvent if optionally used has a boiling point either lower or higher than the boiling point of the glycidyl ester. In this preferred embodiment, the α-hydroxy ester reaction product may be washed with water to remove homogeneous coupling catalyst(s). The washed α-hydroxy ester reaction product may be distilled under atmospheric, subatmospheric or superatmospheric conditions to recover solvent(s) if optionally used and to recover unreacted, excess glycidyl ester. The solvent(s) and glycidyl ester recovered may be recycled directly to the coupling reactor; or the solvent(s) and glycidyl ester recovered may be additionally purified before being recycled to the coupling reactor. The α-hydroxy ester derivative isolated by this process may be used with or without additional purification. The processing steps described above may be carried out in any order to efficiently separate the coupling catalyst(s), solvent and glycidyl ester from each other.

In a second preferred embodiment of the present invention, the solvent, if optionally used, is selected to have a higher boiling point than the boiling point of the glycidyl ester. In this embodiment, the α-hydroxy ester reaction product may be washed with water to remove homogeneous coupling catalyst. The washed α-hydroxy ester reaction product may be distilled under atmospheric, subatmospheric or superatmospheric conditions to recover excess, unreacted glycidyl ester which may be recycled directly to the coupling reactor or which may be additionally purified before being recycled to the coupling reactor. In this embodiment, the solvent which has a higher boiling point than the glycidyl ester is not removed by distillation and the mixture of solvent and α-hydroxy ester is directly carried forward to the halide substitution-deesterification step of the present invention.

In the process of the present invention, the coupling of an active hydrogen-containing compound, such as a phenol, and a glycidyl ester, such as glycidyl acetate, easily takes place to make the α-hydroxy ester derivative. The reaction selectivity to the desired α-hydroxy ester derivative is maximized under the set of conditions that optimize catalyst, solvent and temperature. Maximum selectivity to the desired α-hydroxy ester derivative is obtained when the phenolic reactant attacks the glycidyl ester at the terminal methylene (—CH$_2$—) group of the epoxide moiety. When the phenolic reactant attacks the glycidyl ester at the internal methine (—CH=) group of the epoxide moiety, a α-hydroxy ester derivative is formed. Such a α-hydroxy ester derivative can not be converted to the desired α-chlorohydrin intermediate of the present invention.

Under the conditions of the coupling reaction, the α-hydroxy ester derivative may comprise a single component or a mixture of two or more components. For example, when the α-hydroxy ester derivative is a single component, the single component is a compound containing an α-hydroxy ester moiety. For example, when the α-hydroxy ester derivative is two or more components, one of the components which make up the α-hydroxy ester derivative must be a compound which contains at least one α-hydroxy ester moiety, with or without other moieties, and the other component(s) may be selected from a compound containing at least one α-diester moiety and a compound containing at least one α-glycol moiety. It is contemplated that one of the components that make up the α-hydroxy ester derivative may include a compound which contains a mixture of two or more moieties selected from an α-hydroxy ester moiety, an α-diester moiety and an α-glycol moiety.

As one embodiment of the present invention, phenol is reacted with glycidyl acetate, to form an α-hydroxy ester derivative which is a mixture comprising an α-hydroxy acetate compound as the major component; and an α-diacetate compound and an α-glycol compound as the minor components of the α-hydroxy ester derivative. It is theorized that during the coupling reaction a series of transesterification reactions may occur in which the α-hydroxy acetate compound is converted into a mixture including an α-diacetate and an α-glycol compound.

As described above, the α-hydroxy ester derivative of the present invention may comprise a single component or a mixture of two or more components. Generally, the α-hydroxy ester derivative of the present invention contains α-hydroxy ester moieties, α-diester moieties and α-glycol moieties in a ratio of 5–100 percent:0–95 percent:0–95 percent, respectively; preferably in a ratio of 15–100 percent:0–85 percent:0–85 percent, respectively; and more preferably in a ratio of 30–100 percent:0–70 percent:0–70 percent, respectively.

The following reaction sequence, Reaction Sequence (VI), generally illustrates the reaction of coupling phenol and glycidyl acetate and the sequential transesterification reactions. More specifically, Reaction Sequence (VI) shows the coupling reaction between phenol and glycidyl acetate yielding the α-hydroxy ester derivative of the present invention comprising an α-hydroxy acetate, an α-diacetate and an α-glycol.

Reaction Sequence (VI)

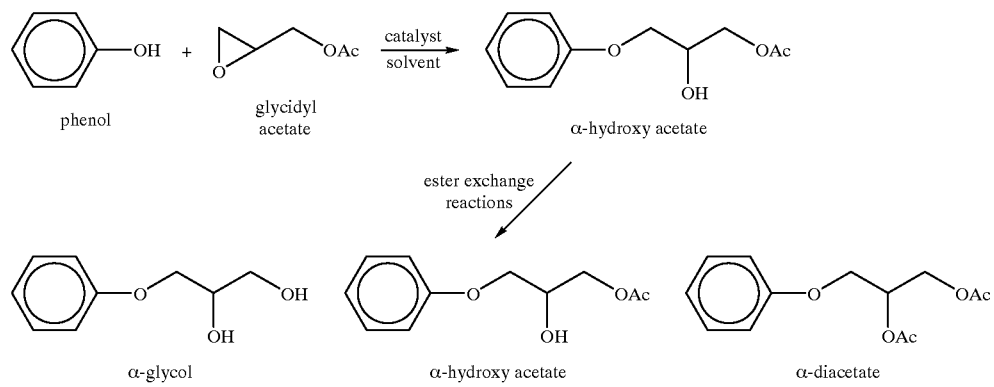

The α-hydroxy ester derivative of the present invention formed when the phenolic reactant reacts with a glycidyl ester may be a reactant in sequential reactions other than transesterification reactions. In two other of the sequential reactions of the α-hydroxy ester derivative, the α-hydroxy ester component of the derivative reacts with more glycidyl ester. In one of the two other reactions, the hydroxy group of the α-hydroxy ester component reacts with the epoxide moiety of a glycidyl ester forming a product containing two glycidyl ester molecules. This reaction between the hydroxy group of the α-hydroxy ester component and the glycidyl ester may be repeated forming a second product containing three glycidyl ester molecules. This reaction may be repeated more than two times.

The second of the other reactions is an ester exchange reaction of the glycidyl ester with the hydroxy group of the α-hydroxy ester component of the derivative forming an α-diester and a glycidol derivative.

When the above sequential reactions of the α-hydroxy ester derivative are minimized by optimizing catalyst, solvent and temperature, the glycidyl ester selectivity to α-hydroxy ester derivative is greater than 65%. More preferred, the glycidyl ester selectivity to the desired α-hydroxy ester derivative is greater than 80%. Most preferred, the glycidyl ester selectivity to the desired α-hydroxy ester derivative is greater than 95%.

The following reaction sequence, Reaction Sequence (VII), generally illustrates the two sequential reactions described above of an α-hydroxy ester derivative and the glycidyl ester. The two sequential reactions shown are for the reaction of phenol and glycidyl acetate coupling product with glycidyl acetate. More specifically, Reaction Sequence (VII) shows sequential reactions of the α-hydroxy acetate derivative of phenol and glycidyl acetate showing sequential hydroxy-epoxy coupling reaction and sequential ester exchange reaction.

Examples of mononuclear phenolic compounds useful in the present invention are represented by the following Formula XII:

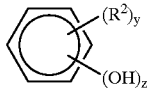

Formula XII

In Formula XII, y, z and $R^2$ have the same meaning as described above with reference to Formula II, and OH has the same meaning as described above with reference to Formula XI.

Included among the compounds represented by Formula XII are, for example, 4-methylphenol; 4-methoxyphenol; 2,6-dimethylphenol; 2,6-diisopropylphenol; 2,6-dibromophenol; 1,2-dihydroxybenzene; 1,3-dihydroxybenzene; 1,4-dihydroxybenzene; and mixtures thereof.

Other examples of phenolic compounds useful in the present invention are binuclear phenolic compounds which are represented by the following Formula XIII:

Reaction Sequence (VII)

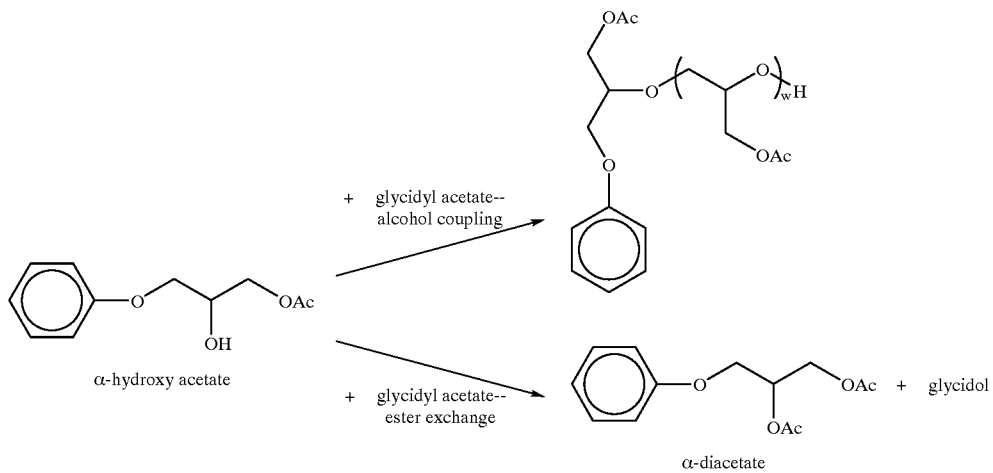

wherein w may be 1 to 6.

Phenolic Compounds

The phenolic compounds, Component (E), useful in the above process for making the α-hydroxy ester derivatives, are represented by, but not limited to, the structures of the following Formulas XI-XV. A preferred class of phenolic compounds useful in the present invention to react with glycidyl esters to make α-hydroxy ester derivatives is generically represented by the following Formula XI:

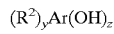 Formula XI

In Formula XI, y, z, Ar and $R^2$, are as defined previously for Formula I, and OH is a hydroxyl group substituted for hydrogen atom on the aromatic ring(s) of the Ar moiety.

More specific and preferred examples of phenolic compounds useful in the present invention are represented by Formulas XII–XV, separately or as mixtures of two or more phenolic compounds of Formulas XII-XV which follow.

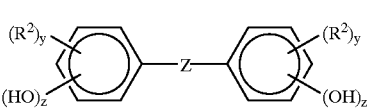

Formula XIII

In Formula XIII, y, z, $R^2$ and Z have the same meaning as described above with reference to Formula III, and OH has the same meaning as described above with reference to Formula XI.

Included among the phenolic compounds represented by Formula XIII are, for example, 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl)methane; bis(4-hydroxyphenyl) sulfone; 2,2-bis(3,5-dibromo-4-hydroxyphenyl) isopropylidene; 2,2-bis(4-hydroxyphenyl)isopropylidene; bisphenol K; 9,9-bis(4-hydroxyphenyl)fluorene; 4,4'- dihydroxy-α-methylstilbene; 1,3-bis(4-hydroxylphenyl) adamantane; and mixtures thereof.

Other examples of phenolic compounds useful in the present invention are multinuclear phenolic compounds which are represented by the following Formula XIV:

Formula XIV

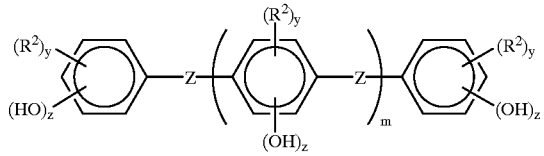

In Formula XIV, y, z, $R^2$, Z and m have the same meaning as described above with reference to Formula IV, and OH has the same meaning as described above with reference to Formula XI.

Included among the phenolic compounds represented by Formula XIV are, for example, phenol-formaldehyde novolac (functionality greater than 2); o-cresol-formaldehyde novolac (functionality greater than 2); phenol-dicyclopentadienyl novolac (functionality greater than 2); naphthol-formaldehyde novolac (functionality greater than 2); and mixtures thereof.

Other examples of phenolic compounds useful in the present invention are multi-nuclear phenolic compounds which are represented by the following Formula XV:

Formula XV

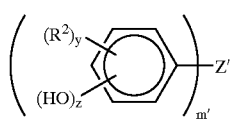

In Formula XV, y, z, $R^2$, Z' and m' have the same meaning as described above with reference to Formula V, and OH has the same meaning as described above with reference to Formula XI Included among the phenolic compounds represented by Formula XV are, for example, tris(4-hydroxyphenyl) methane; 1,1,1-tris(3,5-dimethyl-4-hydroxyphenyl) methane; 1,1,2,2-tetrakis(4-hydroxyphenyl)ethane; and mixtures thereof.

The preferred phenolic compounds of the present invention include more specifically, the phenols, such as 1,3-dihydroxybenzene; 1,4-dihydroxybenzene; 1,5-dihydroxynaphthalene; 2,6-dihydroxynaphthalene; 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl) methane; 4,4'-bis(2,6-dibromophenol)isopropylidene; 2,2-bis(4-hydroxyphenyl)isopropylidene; phenol-formaldehyde novolac (functionality >2); o-cresol-formaldehyde novolac (functionality >2); phenol-dicyclopentadienyl novolac (functionality >2); naphthol-formaldehyde novolac (functionality >2); 1,1,1-tris(4-hydroxyphenyl) methane; 1,1,2,2-tetrakis(4-hydroxyphenyl)ethane; and mixtures thereof.

Glycidyl Ester

The glycidyl ester, Component (D), useful in the above process for making the α-hydroxy ester derivatives, is a material known to those skilled in the art and is represented by the following Formula XVI:

Formula XVI

In Formula XVI, $R^4$ is as defined previously for Formula VI.

In Formula XVI, $R^5$ is a glycidyl moiety preferably selected from:

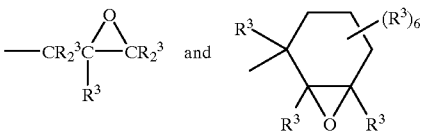

where O is oxygen, and $R^3$ is as defined previously for Formula VI.

In one embodiment, when $R^5$ in Formula XVI above is

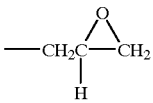

the glycidyl ester is a "glycidyl ester."

Examples of glycidyl esters useful in the present invention are glycidyl formate, glycidyl acetate, glycidyl propionate, glycidyl butyrate, glycidyl cyclopentanoate, glycidyl cyclohexanoate, glycidyl benzoate, glycidyl naphthanoate and mixtures thereof.

In another embodiment, when $R^5$ in Formula XVI above is

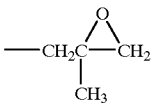

the glycidyl ester is a "methylglycidyl ester."

Examples of methylglycidyl esters useful in the present invention are methylglycidyl formate, methylglycidyl acetate, methylglycidyl propionate, methylglycidyl butyrate, methylglycidyl cyclopentanoate, methylglycidyl cyclohexanoate, methylglycidyl benzoate, methylglycidyl naphthanoate and mixtures thereof.

In yet another embodiment, when $R^5$ in Formula XVI above is

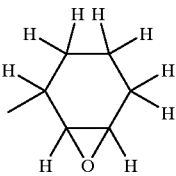

the glycidyl ester is a "cyclohexylglycidyl ester."

Examples of cyclohexylglycidyl esters useful in the present invention are cyclohexylglycidyl formate, cyclohexylglycidyl acetate, cyclohexylglycidyl propionate, cyclohexylglycidyl butyrate, cyclohexylglycidyl cyclopentanoate, cyclohexylglycidyl cyclohexanoate, cyclohexylglycidyl benzoate, cyclohexylglycidyl naphthanoate and mixtures thereof.

The glycidyl esters most useful in the present invention are glycidyl formate, glycidyl acetate, methylglycidyl formate and methylglycidyl acetate. The most preferred glycidyl ester for use in the present invention is glycidyl acetate.

The glycidyl esters of Formula XVI above can be prepared by any of several well-known processes. In one such process, carboxylic acids are esterified through reaction with epichlorohydrin (ECH) in the presence of base. Such a process for making glycidyl esters is described by R. Nair, et al., in Synth. Commun., 29, (15), pp. 2559–2566, (1999), which is incorporated herein by reference.

In another well-known process for making glycidyl esters, carboxylic acid esters are transesterified with glycidol in the presence of catalysts. Such a transesterification process is described by H. Zondler, et al., in Helv. Chim. Acta, 60, (6), pp. 1845–1860, (1977), which is incorporated herein by reference.

In yet another well-known process for making glycidyl esters, carboxylic acid halides are esterified through reaction with glycidol and a tertiary amine. Such general esterification process is discussed by J. March, Advanced Organic Chemistry, Third Edition, pp. 346–347, John Wiley & Sons, New York, (1985), which is incorporated herein by reference.

In one preferred embodiment, glycidyl esters are prepared by epoxidizing (H) an allyl ester by any of several well-know epoxidation reaction processes, such as for example by reacting the allyl ester, Component (H), with (I) an oxidant material.

Glycidyl esters, in general, and glycidyl acetate, in particular, can be prepared by epoxidizing the corresponding allyl ester using a number of oxidants. The oxidant, Component (I), useful in the above process may be, for example, aromatic and aliphatic organic peracids, organic peroxyimidic acids, dioxiranes and hypochlorous acid. Glycidyl esters, in general, and glycidyl acetate, in particular, can also be prepared by epoxidizing the corresponding allyl ester by catalytic epoxidation using air (oxygen), hydrogen peroxide and organic hydroperoxides as oxidants.

In one embodiment of the present invention, processes which use aromatic peracids such as, for example, m-chloroperbenzoic acid, described by A. Garcia Martinez, M. Oliver Ruiz, and J. L. M. Contelles in Synthesis, 1, pp. 125–128, (1986), which is incorporated herein by reference; peroxybenzoic acid, described by Moffett and Slomp in J. Amer. Chem. Soc., 76, pp. 3678–3681, (1954), which is incorporated herein by reference; and monoperoxyphthalic acid, described by Bohlmann and Sinn in Chem. Ber., 88, pp. 1869–1876, (1955), which is incorporated herein by reference; may be used to effect epoxidation of allyl esters in excellent yields.

In another embodiment of the present invention, processes which use aliphatic peracids, such as, for example, peracetic acid (also known as peroxyacetic acid) are also very effective oxidants for synthesizing glycidyl esters from allyl esters and are described, for example, in U.S. Pat. No. 2,761,870, which is incorporated herein by reference. This type of oxidant can also be generated in situ by reaction of air (oxygen) with the corresponding aliphatic aldehyde, as described in U.S. Pat. No. 4,721,798, which is incorporated herein by reference.

In another embodiment of the present invention, processes which use peroxyimidic acids, such as the one described by R. Murry in J. Org. Chem., 63, pp. 1730–1731, (1998), which is incorporated herein by reference, are useful in the synthesis of glycidyl esters from allyl esters.

In another embodiment of the present invention, organic dioxiranes may also effect the epoxidation of allyl esters to glycidyl esters. Dimethyldioxaranes are described, for example, by R. Murry in Chem. Rev., 89, pp. 1187-120, (1989), which is incorporated herein by reference. Perfluorodimethyldioxaranes from a perfluoroketone and hydrogen peroxide are described, for example, by R. Sheldon in Chem. Commun., pp. 263–264, (1999), which is incorporated herein by reference.

In still another embodiment of the present invention, hypochlorous acid, optionally as its alkali metal salt, and an inorganic base, such as sodium hydroxide, sodium carbonate, potassium hydroxide, potassium carbonate or calcium hydroxide, may be used to give high yields of allyl ester epoxidation products, as described by A. Foucaud and E. de Rouille in Synthesis, 9, pp. 787–789, (1990) which is incorporated herein by reference.

In yet another embodiment of the present invention, processes which use catalysts and air (oxygen) as oxidant can be used to make glycidyl esters from allyl esters. Examples of such catalysts include silver or gold on titanium silicate supports, as described in WO 9952883, WO 9900188 and WO 9800415; and Pt(III) halide catalysts, as described in U.S. Pat. No. 5,670,674; all of which are incorporated herein by reference.

In another embodiment of the present invention, processes which use catalysts and hydrogen peroxide or organic hydroperoxides as oxidant may be reacted with allyl esters to form glycidyl esters as described in WO 99/62894, which is incorporated herein by reference. More specifically, glycidyl esters may be made from allyl esters in the presence of titanium-containing zeolites, as described, for example, in U.S. Pat. Nos. 5,684,170 and 5,466,835; in the presence tungsten oxides, as described by Y. Fort, A. Olszewski-Ortar, and P. Caubere in Tetrahedron, 48, pp. 5099–5110, (1992); in the presence of rhenium salts as described in WO 9833786; and in the presence of manganese salts, as described by D. E. De Vos, B. F. Sels, M. Reynaers, Y. V. S. Rao, and P. A. Jacobs in Tetrahedron Lett., 39, pp. 3221–3224, (1998); all of which are incorporated herein by reference.

Hydrogen peroxide can also be used in conjunction with organic and organometallic co-reagents, such as ketones, as described in EP 129,814 and DE 3,323,329; anhydrides, as described in U.S. Pat. No. 4,590,286; and aryl selenium compounds, as described in JP 59,076,077 aryl diselenides in which the aryl groups are substituted with electron withdrawing groups such as, for example, perfluoromethyl, fluoro, chloro and nitro and described by R. A. Sheldon, et al., in J. Chem. Soc., Perkin Trans., 1, pp. 224–228, (2001); all of which are incorporated herein by reference.

In another embodiment of the present invention, glycidyl esters may be made by processes which use catalysts and organic hydroperoxides as oxidants to epoxidize allyl esters. Glycidyl esters may be made from allyl esters in the presence of organic hydroperoxides and various catalysts, such as, for example, certain binary borides, as described in U.S. Pat. Nos. 4,215,061; 4,215,060; and 4,215,059; and British Patent GB 1,517,908; titanium silicates, as described in U.S. Pat. No. 5,780,654; vanadium-porphyrin complexes, as described in Japanese Patent JP 60,190,774; titanium alkoxides, as described by H. Hoshi, T. Ohnuma, S. Aburaki, M. Konishi, and T. Oki in Tetrahedron Lett., 34, pp. 1047–1050, (1993); and vanadium oxide complexes, as described by H. H. A. M. Hassan and C. Tamm in Helv. Chim. Acta, 77, pp. 838–849, (1994); all of which are incorporated herein by reference.

Metal oxides known to epoxidize allyl esters include those based on ruthenium, as described by H. Ohtake, T. Higuchi, and M. Hirobe in *Tetrahedron Lett.*, 33, pp. 2521–2524, (1992); chromium, as described by F. Bohlmann, J. Jakupovic, H. Robinson, and R. M King in *Phytochemistry*, pp. 109–112, (1981); and platinum, as described by T. Nakashima, T. Ueno, and H. Fukami in *Tetrahedron Lett.*, 23, pp. 4469–4472, (1982); all of which are incorporated herein by reference.

The allyl ester, Component (H), used in the above process for making the glycidyl esters, is a common material known to those skilled in the art and is represented by the following Formula XVII:

Formula XVII

In Formula XVII, $R^4$ is as defined previously for Formula VI.

In Formula XVII, $R^6$ is an allyl moiety preferably selected from:

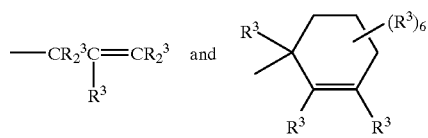

where $R^3$ is as defined previously for Formula VI.

In one embodiment, when $R^6$ in Formula XVII above is the following structures:

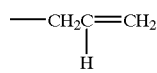

the allyl ester is an "allyl ester."

The allyl esters useful in the present invention, include for example, but are not limited to, allyl formate, allyl acetate, allyl propionate, allyl butyrate, allyl cyclopentanoate, allyl cyclohexanoate, allyl benzoate and allyl naphthanoate.

In another embodiment, when $R^6$ in Formula XVII above is the following structure:

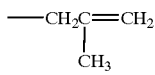

the allyl ester is a "methallyl ester."

The methallyl esters useful in the present invention, include for example, but are not limited to, methallyl formate, methallyl acetate, methallyl propionate, methallyl butyrate, methallyl cyclopentanoate, methallyl cyclohexanoate, methallyl benzoate, and methallyl napthanoate, In yet another embodiment, when $R^6$ in Formula XVII above is the following structure:

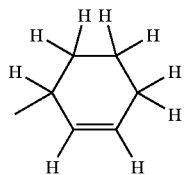

the allyl ester is a "cyclohexenyl ester."

The cyclohexenyl esters useful in the present invention, inclue for example, but are not limited to, are cyclohexenyl formate, cyclohexenyl acetate, cyclohexenyl propionate, cyclohexenyl butyrate, cyclohexenyl cyclopentanoate, cyclohexenyl cyclohexanoate, cyclohexenyl benzoate and cyclohexenyl napthanoate.

The preferred allyl esters most useful in the present invention are allyl formate, allyl acetate, methanyl formate and methallyl acetate. The most preferred allyl ester for use in the present invention is allyl acetate.

The allyl ester, Component (H), useful in the above process can be prepared by any of several well-known methods. In one such process for preparing Component (H), carboxylic acids or carboxylic acid anhydrides are esterified through reaction with allyl alcohol or substituted allyl alcohols. Such esterification methods are described by G. Mallavarapu, et al., in *Indian J. Chem., Sec. B,* (16 B), pp. 725–726, (1978) and in German Patents DE 2,504,231 and 2,504,230; all of which are incorporated herein by reference.

In another well-known process for making allyl esters, carboxylic acid esters are transesterified with allyl alcohol or substituted allyl alcohols in the presence of catalysts. Such a transesterification process is described in U.S. Pat. No. 4,112,235, which is incorporated herein by reference.

In yet another well-known process for making allyl esters, carboxylic acid salts are reacted with allyl halides, for instance allyl chloride or allyl bromide, or substituted allyl halides. Such esterification processes are described in Japan Patents JP 53108914 and 43027849; and by T. Kawaki, et al. in *Bull. Chem. Soc. Jap.*, 45, (10), pp. 3130–3132, (1972); all of which are incorporated herein by reference.

In yet another process for making allyl esters, allyl alcohols or substituted allyl alcohols are reacted with aldehydes and oxygen in the presence of catalysts. Such an esterification process is described by French Patent FR 1563259, which is incorporated herein by reference.

Allyl esters in general, and allyl acetate in particular, can be preferably prepared by the oxidative carboxylation of propylene or a propylene derivative. The allyl ester most useful in the present invention is allyl acetate and allyl acetate may be made, for example, by palladium or other transition metal catalyzed oxidative acetoxylation of propene with acetic acid, such as described in U.S. Pat. Nos. 3,970,713; 4,647,690; and 5,011,980; all of which are incorporated herein by reference.

Another allyl ester useful in the present invention is methallyl acetate which may be synthesized from isobutylene using a process similar to that for allyl acetate such as described in German Patents DE 1,964,085 and DE 2,057, 087 and in Japanese patents JP 53,127,409 and JP 57,131, 741; all of which are incorporated herein by reference.

Epoxy Compounds

The aryl glycidyl ether epoxy compounds that are made by the process of the present invention are represented by, but not limited to, the structures of the following Formulas XVIII–XXII:

$(R^2)_y Ar(OR^{1''})_z$                                      Formula XVIII

In Formula XVIII, y, z, Ar, O and $R^2$ are as defined previously for Formula I.

In Formula XVIII, $R^{1'''}$ is a glycidyl-containing moiety preferably selected from:

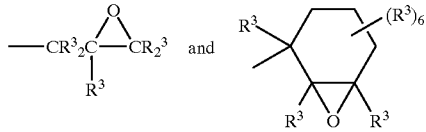

where $R^3$ is as defined previously for Formula I.

In one embodiment, when $R^{1'''}$ in Formula XVIII above has the following structure:

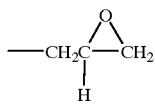

the glycidyl ether is a "glycidyl ether."

In Formula XVIII, $R^{1'''}$ is a glycidyl-containing moiety preferably selected from:

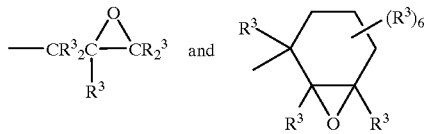

where $R^3$ is as defined previously for Formula I.

In one embodiment, when $R^{1'''}$ in Formula XVIII above has the following structure:

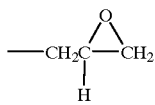

the glycidyl ether is a "glycidyl ether."

In another embodiment, when $R^{1'''}$ in Formula XVIII above has the following structure:

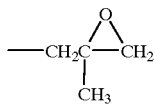

the glycidyl ether is a "methylglycidyl ether."

In yet another embodiment, when $R^{1'''}$ in Formula XVIII above has the following structure:

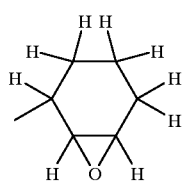

the glycidyl ether is a "cyclohexylglycidyl ether."

More specific and preferred examples of epoxy resins that may be prepared according to the present invention are represented by Formulas XIX–XXII which follow.

Examples of mononuclear aryl glycidyl ether epoxy resins that may be prepared according to the present invention are represented by the following Formula XIX:

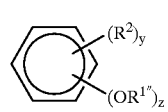

Formula XIX

In Formula XIX, y, z, O and $R^2$ have the same meaning as described above with reference to Formula II. In Formula XIX, $R^{1'''}$ has the same meaning as described above with reference to Formula XVIII. Mononuclear phenols useful as precursors for preparing the above mononuclear aryl glycidyl ether epoxy resins of the present invention are, for example, 2-methylphenol; 4-methylphenol; 4-methoxyphenol; 2,6-dimethylphenol; 2,6-diisopropylphenol; 2,6-dibromophenol; 1,2-dihydroxybenzene; 1,3-dihyroxybenzene; 1,4-dihydroxybenzene; and mixtures thereof.

Other examples of aryl glycidyl ethers prepared by the process of the present invention are the dinuclear aryl glycidyl ether epoxy resins that are represented by the following Formula XX:

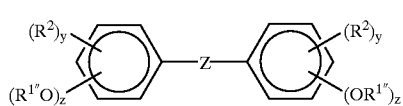

Formula XX

In Formula XX, y, z, Z, O and $R^2$ have the same meaning as described above with reference to Formula III. In Formula XX, $R^{1'''}$ has the same meaning as described above with reference to Formula XVIII.

Phenols useful for making the epoxy resins of Formula XX include, for example, 4,4'-dihydroxybiphenyl; 3,3',5,5-tetramethyl-4,4'-dihydroxybiphenyl; 3,31,5,5'-tetramethyl-2,2',6,6'-tetrabromo-4,4'-dihydroxybiphenyl; bis(4-hydroxyphenyl)methane; bis(4-hydroxyphenyl)sulfone; 2,2-bis(3,5-dibromo-4-hydroxyphenyl)isopropylidene; 2,2-bis(4-hydroxyphenyl)isopropylidene; bisphenol K; 9,9-bis(4-hydroxyphenyl)fluorene; 4,4'-dihydroxy-α-methylstilbene; 1,3-bis(4-hydroxylphenyl)adamantane; and mixtures thereof.

Other examples of aryl glycidyl ethers prepared by the process of the present invention are the multi-nuclear aryl glycidyl ether epoxy resins are represented by the following Formula XXI:

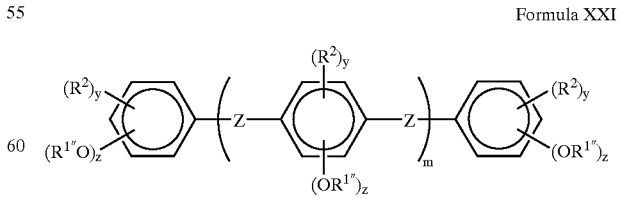

Formula XXI

In Formula XXI, y, z, Z, O, $R^2$ and m are as described above for Formula IV. In Formula XXI, $R^{1'''}$ has the same meaning as described above with reference to Formula XVIII.

Phenols useful for making the epoxy resins of Formula XXI include, for example, phenol-formaldehyde novolac (functionality greater than 2); o-cresol-formaldehyde novolac (functionality greater than 2); phenol-dicyclopentadienyl novolac (functionality greater than 2); napthol-formaldehyde novolac (functionality greater than 2); and mixtures thereof.

Still other exampes of aryl glycidyl ethers prepared by the process of the present invention are the multi-nuclear aryl glycidyl ether epoxy resins that are represented by the following Formula XXII:

Formula XXII

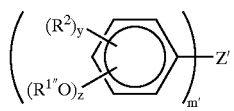

In Formula XXII, y, z, Z", O, R² and m" are the same as previously described above for Formula V. In Formula XXII, R¹" has the same meaning as described previously with reference to Formula XVIII.

Phenols useful for making the epoxy resins of Formula V include, for example, tris(4-hydroxyphenol) methane; 1,1,1-tris(3,5-dimethyl-4-hydroxyphenol)methane; 1,1,2,2-tetrakis(4-hydroxyphenol)ethane; and mixtures thereof.

The preferred epoxy resins useful in the present invention include, for example more specifically, the epoxy resins made from the following phenols, such as 1,3-dihydroxybenzene; 1,4-dihydroxybenzene; 1,5dihydroxynapthalene; 2,6-dihydroxynapthalene; 4,4'-dihydroxybiphenyl; 3,3',5,5'-tetramethyl-4,4'-dihydroxybiphenyl; 3,3',5,5'-tetramethyl-2,2',6,6'-tetrabromo-4,4'-dihydroxybiphenyl; bis(4-hydroxyphenyl)methane; 2,2-bis(4-hydroxyphenyl) isopropylidene; phenol-formaldehyde novolac (functionality greater than 2); o-cresol-formaldehyde novolac (functionality greater than 2); phenol-dicyclopentadienyl novolac (functionality greater than 2); napthol-formaldehyde novolac (functionality greater than 2); 1,1,1-tris(4-hydroxyphenyl)methane; 1,1,2,2-tetrakis(4-hydroxyphenyl)ethane; and mixtures thereof.

Examples of preferred aryl glycidyl ethers and aryl methylglycidyl ethers made by the process of the present invention include for example 1,3-dihydroxybenzene diglycidyl ether; 1,3-dihydroxybenzene dimethylglycidyl ether; 1,4-dihydroxybenzene diglycidyl ether; 1,4-dihydroxybenzene dimethylglycidyl ether; 1,5-naphthalene diglycidyl ether; 1,5-naphthalene dimethylglycidyl ether; 2,6-naphthalene diglycidyl ether; 2,6-naphthalene dimethylglycidyl ether; 4,4'-dihydroxybiphenyl diglycidyl ether; 4,4'-dihydroxybiphenyl dimethylglycidyl ether; 3,3',5,5'-tetramethyl-4,4'-dihydroxybiphenyl diglycidyl ether; 3,3',5,5'-tetramethyl-4,4'-dihydroxybiphenyl dimethylglycidyl ether; 3,3',5,5'-tetramethyl-2,2',6,6'-tetrabromo-4,4'-dihydroxybiphenyl diglycidyl ether; 3,3',5,5'-tetramethyl-2,2',6,6'-tetrabromo-4,4'-dihydroxybiphenyl dimethylglycidyl ether; bis(4-hydroxyphenyl)methane diglycidyl ether; bis(4-hydroxyphenyl)methane dimethylglycidyl ether; 2,2-bis(4-hydroxyphenyl) isopropylidene diglycidyl ether; 2,2-bis(4-hydroxyphenyl)isopropylidene dimethylglycidyl ether; phenol-formaldehyde novolac glycidyl ether (functionality greater than 2); phenol-formaldehyde novolac methylglycidyl ether (functionality greater than 2); o-cresol-formaldehyde novolac glycidyl ether (functionality greater than 2); o-cresol-formaldehyde novolac methylglycidyl ether (functionality greater than 2); phenol-dicyclopentadienyl novolac glycidyl ether (functionality greater than 2); phenol-dicyclopentadienyl novolac methylglycidyl ether (functionality greater than 2); naphthol-formaldehyde novolac glycidyl ether (functionality greater than 2); naphthol-formaldehyde novolac methylglycidyl ether (functionality greater than 2); 1,1,1tris(4-hydroxyphenyl)methane triglycidyl ether, 1,1,1-tris(4-hydroxyphenyl)methane trimethylglycidyl ether; 1,1,2,2-tetrakis(4-hydroxyphenyl)ethane tetraglycidyl ether; 1,1,2,2-tetrakis(4-hydroxyphenyl)ethane tetramethylglycidyl ether; and mixtures thereof.

With reference back to the process of making an α-halohydrin intermediate of the present invention described above, the α-halohydrin intermediate can be converted to the epoxy resin by standard procedures well known to those skilled in the art using bases in solution or solid form such as sodium hydroxide, calcium hydroxide, potassium hydroxide, sodium carbonate or mixtures thereof. The amount of base used is from about 0.7 to about 1.2 equivalents of base per halohydrin equivalent being epoxidized. The epoxidation procedures may be run with a solvent or mixture of solvents or without solvent. The epoxidation procedures are typically run at elevated temperatures which may vary from 10° C. to 130° C. The epoxidation procedures may be run under atmospheric, superatmospheric, or under subatmospheric pressure. The epoxidation procedures may also be run under conditions that do not remove the water which is introduced with the base and which forms in the reaction, or the epoxidation procedures may be run under conditions that remove the water under azeotropic conditions. It is desired to run the epoxidation procedures under conditions that remove water by azeotropic distillation in order to produce epoxy resins having higher epoxide content. The epoxidation procedures may be run including phase transfer catalysts, for example, such as the same phase transfer catalysts described previously. The epoxidation procedures may be carried out as a batch reaction wherein the base may be added in one part initially, added intermittently or added continuously. The epoxidation procedure may also be carried out as a continuous reaction wherein the α-halohydrin intermediate, the base, the solvent and optionally the phase transfer catalyst are added simultaneously and continuously to a reactor. When the epoxidation procedure is carried out as a continuous reaction, the reactor may be a single, one-stage reactor or the reactor may be a complex reactor having multiple stages. Such epoxidation procedures, including post-treatment procedures for achieving low chlorine epoxy resins for electronic applications, are generally taught in U.S. Pat. Nos. 4,499,255; 4,778,863; 4,785,061; and 5,028,686; all of which are incorporated herein by reference.

With reference back to the α-hydroxy ester derivative of at least one or more phenols, Component (A) above, the α-hydroxy ester derivative is preferably prepared using a three-step process which includes: (1) manufacturing an allyl ester or a substituted allyl ester, Component (H); (2) manufacturing a glycidyl ester or a substituted glycidyl ester, Component (D), from the allyl ester of Step (1); and (3) coupling at least one or more phenols, Component (E), with the glycidyl ester or a substituted glycidyl ester of Step (2) to manufacture the α-hydroxy ester derivative of at least one or more phenols, Component (A).

When the α-hydroxy ester derivative, Component (A), is prepared by the above three-step process and such three-step process is combined with the above-described process for preparing an α-halohydrin intermediate from the α-hydroxy ester derivative and with a process for making an epoxy resin from the α-halohydrin, generally, the process of the present invention for making phenol-based epoxy resins may be illustrated by the following five-step process which is one embodiment of the present invention:

Step 1: Oxidatively carboxylating a propylene or a propylene derivative to manufacture an allyl ester or a substituted allyl ester;

following general reaction sequence, Reaction Sequence (VIII), showing the manufacture of bisphenol A epoxy resin from propylene. More specifically, Reaction Sequence (VIII) shows the conversion of propylene to bisphenol A epoxy resin via the conversion of a bis(α-hydroxy acetate) derivative to a bis(α-chlorohydrin) intermediate.

Reaction Sequence (VIII)

Step 1

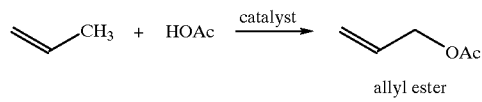

allyl ester

Step 2

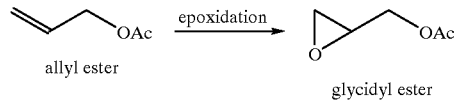

glycidyl ester

Step 3

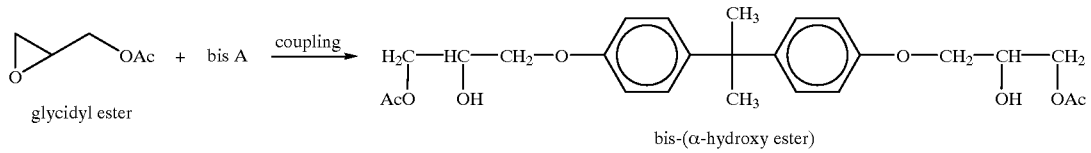

bis-(α-hydroxy ester)

Step 4

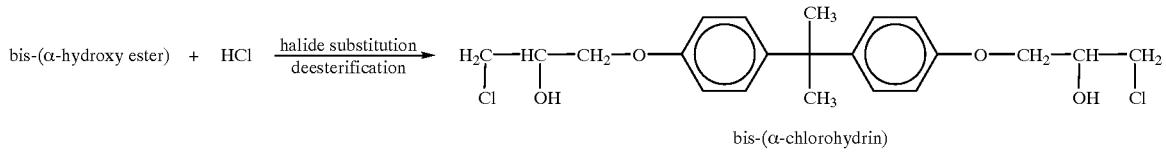

bis-(α-chlorohydrin)

Step 5

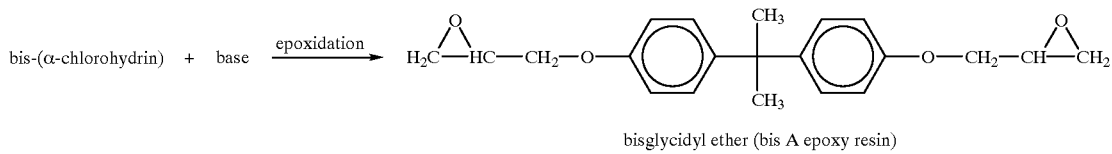

bisglycidyl ether (bis A epoxy resin)

Step 2: Epoxidizing the allyl ester or a substituted allyl ester of Step 1 to manufacture a glycidyl ester or a substituted glycidyl ester;

Step 3: Reacting at least one or more phenols with a glycidyl ester or a substituted glycidyl ester of Step 2 in the presence of selected catalysts where the reaction is the coupling reaction of at least one or more phenols with the epoxide functionality of the glycidyl group of a glycidyl ester or a substituted glycidyl ester to manufacture an α-hydroxy ester derivative comprised predominately of an α-hydroxy ester component of at least one or more phenols;

Step 4: In situ halide substituting-deesterifying the α-hydroxy ester derivative comprised predominately of an α-hydroxy ester component of at least one or more phenols of Step 3 to manufacture an α-halohydrin intermediate of the present invention; and Step 5: Epoxidizing the α-halohydrin intermediate of Step 4 by a ring-closure process using a base to convert the α-halohydrin intermediate of Step 4 to a phenol-based epoxy resin.

In one embodiment of the present invention, the above five-step process may be more specifically illustrated by the The above Reaction Sequence (VIII) shows only the major component, the bisphenol A bis(α-hydroxy acetate), of the bis(α-hydroxy ester) derivative, that is made in Step 3. Other minor components may be prepared during the Reaction Sequence (VIII). Included among the minor components which comprise the bis(α-hydroxy acetate) derivative reaction product of Step 3 may be, for example, phenolic compounds having α-diacetate and α-glycol moieties, such as bisphenol A bis(α-diacetate) and bisphenol A bis(α-glycol), respectively. Also included among the minor components comprising the bis(α-hydroxy acetate) derivative reaction product of Step 3 may be, for example, bisphenol A compounds having two groups, in any combination, selected from the group of moieties comprising α-hydroxy acetate, α-diacetate and α-glycol.

In addition, the above Reaction Sequence (VIII) does not show all the possible positional isomers of the bis(α-hydroxy acetate) and bis(α-chlorohydrin) bis A derivatives shown in Steps 3 and 4, respectively. For example, different positional isomers of the bis(α-hydroxy acetate) bisphenol A derivative shown in Step 3 may be created by switching the positions of the hydroxy and acetate groups on one or on both of the α-hydroxy acetate moieties.

The epoxy resins prepared in the present invention may be used in various applications including for example, coatings, such as water-borne and solvent-borne coatings, can and coil coatings, powder coatings, industrial and marine protective coatings; adhesives; sealants; composites; and electrical applications, such as electrical laminates and electronic encapsulation.

EXAMPLE 1

A. Epoxidation of Allyl Acetate to Glycidyl Acetate

Experiment A1

In this part of Example 1, a 100-mL, four-necked, glass reactor equipped with a cooling condenser, a thermometer, a magnetic stirrer, a nitrogen inlet and a heating lamp with a thermocontroller was employed. To the reactor were added 20 g (0.2 mole) of allyl acetate (commercially available from Aldrich Chemical Co.), 20 mL of methylene chloride, 0.50 g (1.0 mole percent based on the amount of allyl acetate) of methyltrioxorhenium (MTO) and 0.76 g (15 mole percent based on the amount of allyl acetate) of pyrazole. The resultant reaction mixture was stirred at ambient temperature under a nitrogen atmosphere for 5 minutes. Then 38 g (2 molar equivalents based on the amount of allyl acetate) of aqueous 35 percent hydrogen peroxide solution as an oxidant was added into the reactor at ambient temperature. A slight exothermic reaction occurred, and the temperature of the reaction mixture reached 30° C. The reaction was carried out at 25° C. for about 12 hours and then at 30° C. for 2 additional hours.

The reaction mixture was analyzed by gas chromatography (GC)/mass spectrometry (MS) for unreacted allyl acetate, for glycidyl acetate and for hydrolyzed epoxy, which is present as a glycol impurity. The conversion of allyl acetate was greater than 80 percent, and the selectivity to glycidyl acetate was greater than 95 percent.

The crude reaction mixture was extracted with two 100-mL portions of methylene chloride. The methylene chloride extracts were combined and washed with one 50-mL portion of water. The methylene chloride solution was concentrated by rotary evaporation at 90° C. and under a vacuum of 100 mmHg. The crude glycidyl acetate was transferred to a 100-mL, round-bottom flask equipped with a short path distillation apparatus, and 10 g of pure glycidyl acetate was collected upon distillation at 90° C. to 100° C. at less than 15 mmHg.

Experiment A2

In this part of Example 1, a 250-mL, four-necked, glass reactor equipped with a cooling condenser, a thermometer, a magnetic stirrer, a nitrogen inlet and an ice-water cooling bath was employed. To the reactor were added 50 cc of acetonitrile and a mixture containing 0.08 g (0.45 mmole) of $MnSO_4.H_2O$ and 2 g of water. The resultant reaction mixture was thoroughly mixed and 0.12 g of N,N',N"-trimethyl-1,3,9-triazacyclononane (TMTACN, 0.69 mmole mole) was added to the reaction mixture, followed by the addition of a mixture containing 0.042 g (0.45 mmole) of oxalic acid, 0.060 g (0.45 mmole) of sodium oxalate and 2 g of water.

After thoroughly mixing the resultant reaction mixture, 15 g of allyl acetate (0.15 mole) was added into the reaction mixture. The reactor contents were cooled to 10° C., and 28.5 g (0.3 mole) of aqueous 35 percent hydrogen peroxide solution was added to the reaction mixture over about 30 minutes. Upon addition of the first portion of hydrogen peroxide, the reaction mixture immediately turned pink, and then the color quickly disappeared. An exothermic reaction was observed, and the temperature of the reaction mixture increased to 15 to 20° C. The reactor was periodically cooled with the ice-water bath to maintain the reaction temperature at 15° C. The reaction was stopped after 4 hours. The reaction mixture was analyzed by gas chromatography (GC)/mass spectrometry (MS) for unreacted allyl acetate, for glycidyl acetate and for hydrolyzed epoxy, which is present as a glycol impurity. The conversion of allyl acetate was 75 percent, and the selectivity to glycidyl acetate was greater than 95 percent.

The reaction mixture was extracted with two 100-mL portions of methylene chloride. The methylene chloride extracts were combined and washed with one 50-mL portion of water. The methylene chloride-acetonitrile solution of reaction product was concentrated using rotary evaporation at 90° C. and 100 mmHg. The crude glycidyl acetate was transferred to a 100-mL, round-bottom flask equipped with a short path distillation apparatus, and 9.5 g of pure glycidyl acetate was collected upon distillation at 90° C. to 100° C. at less than 15 mmHg.

The above procedure in this Experiment A2 was repeated five additional times, and the products from the total of six experiments were combined to yield a total of 50 g of glycidyl acetate.

Experiment A3

In this part of Example 1, a 100-mL, four-necked, glass reactor equipped with a cooling condenser, a thermometer, a magnetic stirrer, a nitrogen inlet and a heating lamp with thermo-controller was employed. To the reactor were added 20 g (0.2 mole) of allyl acetate (commercially available from Aldrich Chemical Co.), 20 mL of methylene chloride, 1.00 g (2.0 mole percent based on the amount of allyl acetate) of methyltrioxorhenium (MTO) and 1.51 g (15 mole percent based on the amount of allyl acetate) of pyrazole. The resultant reaction mixture was stirred at ambient temperature under a nitrogen atmosphere for 5 minutes. Then 38 g (2 equivalents based on the amount of allyl acetate) of aqueous 35 percent hydrogen peroxide solution as an oxidant was added into the reactor at ambient temperature. A slight exothermic reaction occurred, and the temperature of the reaction mixture reached 27° C. The reaction was carried out at 25° C. for about 12 hours. The reaction mixture was analyzed by gas chromatography (GC)/mass spectrometry (MS) for unreacted allyl acetate, for glycidyl acetate and for hydrolyzed epoxy, which is present as a glycol impurity. The conversion of allyl acetate was greater than 85 percent, and the selectivity to glycidyl acetate was greater than 95 percent.

The crude reaction mixture was extracted with two 100-mL portions of methylene chloride, and the two methylene chloride extracts were combined. The extract was washed once with 50 mL of water. The methylene chloride solution was concentrated using rotary evaporation at 90° C. and 100 mmHg. The crude glycidyl acetate was transferred to a 100-mL, round-bottom flask equipped with a short path distillation apparatus, and 11 g of pure glycidyl acetate collected upon distillation at 90° C. to 100° C. at less than 15 mmHg.

The above procedure in this Experiment A3 was repeated three additional times, and the glycidyl acetate obtained from these three experiments was combined with the glycidyl acetate from Experiment A3 above to yield 45 g of pure glycidyl acetate.

B. Coupling of Glycidyl Acetate with Phenol

Experiment B1

In this part of Example 1, a 100-mL, four-necked, glass reactor equipped with a cooling condenser, a thermometer, a magnetic stirrer, a nitrogen inlet and a heating lamp with thermo-controller was employed. To the reactor were added 11.6 g (0.1 mole) of glycidyl acetate from Experiment A3 above, 20 g of tert-amyl alcohol, 0.075 g (1.5 mole percent based on phenol) benzyltrimethylammonium chloride, and 2.35 g (0.025 mole) of phenol. The resultant reaction mixture was stirred at 85° C. for 7 hours. The crude reaction mixture was analyzed by GC, and the elution times of the products were identical to the products in Example 1 Part C below which were identified by GC/MS analysis. The conversion of phenol was greater than 95 percent and the ratio of 2-hydroxy-3-acetoxy-1-phenoxypropane to 2,3-diacetoxy-1-phenoxypropane was 1.8 (based on GC peak area percent).

Experiment B2

In this part of Example 1, a 50-mL, four-necked, glass reactor equipped with a cooling condenser, a thermometer, a magnetic stirrer, a nitrogen inlet and a heating lamp with thermo-controller was employed. To the reactor were added 11.6 g (0.1 mole) of glycidyl acetate from Experiment A2 above, 20 g of tert-amyl alcohol, 0.075 g (1.5 mole percent based on phenol) benzyltrimethylammonium chloride and 2.35 g (0.025 mole) of phenol. The resultant reaction mixture was stirred at 85° C. for 6 hours. The reaction mixture was analyzed by GC/MS. The conversion of phenol was greater than 95 percent.

To the crude reaction mixture was added 50 mL of methylene chloride, and the solution was washed once with 20 mL of water. The aqueous and organic phases were separated. The excess glycidyl acetate and the tert-amyl alcohol solvent of the organic phase were removed by rotary evaporation at 90° C. and 15 mmHg yielding 2.6 g of crude α-hydroxy acetate derivative of phenol.

The above procedure in this Experiment B2 was repeated two additional times at a scale of 0.075 moles of phenol. The products from the above three experiments were combined to form a total of 17.9 g of α-hydroxy acetate derivative of phenol.

C. In Situ Chloride Substitution-Deesterification of α-Hydroxy Acetate Derivative of Phenol In this part of Example 1, a 100-mL four-necked, glass reactor equipped with a cooling condenser connected to a gas scrubber containing 40 percent KOH, a thermometer, a magnetic stirrer, a fritted glass gas dispersion tube and a heating lamp with thermo-controller was employed. To the reactor were added 15.7 g of the crude α-hydroxy acetate derivative of phenol as prepared in Experiment B2 above and 50 g of 1-methoxy-2-hydroxypropane as solvent. The mixture was heated to 90° C. HCl gas was slowly bubbled into the mixture for about 2 hours after which time the α-hydroxy acetate derivative of phenol was converted into α-chlorohydrin intermediate of phenol. Gas chromatography (GC) coupled with mass spectrometry (MS) analysis indicated that the α-chlorohydrin intermediate formed was 1-chloro-2-hydroxy-3-phenoxypropane in greater than 95 percent yield.

The reaction product was washed from the reactor with two 100-mL portions of methylene chloride. The two 100-mL portions of methylene chloride containing the crude reaction product were combined and washed once with 50 mL of water. The methylene chloride solution was concentrated under vacuum using rotary evaporation at 90° C. and less than 10 mmHg to yield about 10 g of crude α-chlorohydrin intermediate of phenol. GC analysis indicates the product contains a minor amount of 1-methoxy-2-acetoxy-propane, which is formed through transesterification of the 1-methoxy-2-hydroxypropane solvent with the α-hydroxy acetate derivative of phenol.

D. Epoxidation of α-Chlorohydrin Intermediate of Phenol

In this part of Example 1, a 100-mL, four-necked, glass reactor equipped with a cooling condenser, a thermometer, a magnetic stirrer, an addition funnel for liquids and a heating lamp with a thermo-controller was employed. To the reactor were added 10 g of crude α-chlorohydrin intermediate of phenol prepared in Part C above. The crude α-chlorohydrin intermediate contains about 8.5 g of 1-chloro-2-hydroxy-3-phenoxypropane and 1.5 g of 1-methoxy-2-acetoxypropane (the amounts are based on GC area percent data). To the reactor was also added 20 g of 1-methoxy-2-hydroxypropane as solvent. The resultant reaction mixture was heated to 55° C. Using the addition funnel, 5.12 g of 50 percent aqueous NaOH solution (0.065 mole of NaOH) was added slowly to the heated mixture over a period of 15 minutes after which the mixture was allowed to react for about an additional 20 minutes. GC analysis of the resultant product indicated that greater than 95 percent of the α-chlorohydrin intermediate was converted into phenyl glycidyl ether as identified by GC elution time comparison with an authentic sample of phenyl glycidyl ether. This reaction mixture of epoxy product was not further purified.

EXAMPLE 2

A. Epoxidation of Allyl Acetate to Glycidyl Acetate

In this part of Example 2, a 100-mL, four-necked, glass reactor equipped with a cooling condenser, a thermometer, a magnetic stirrer, a nitrogen inlet and a heating lamp with thermo-controller was employed. To the reactor were added 20 g (0.2 mole) of allyl acetate (commercially available from Aldrich Chemical Co.), 40 mL of acetonitrile, 1.28 g (2.5 mole percent based on the amount of allyl acetate) of methyltrioxorhenium (MTO) and 2.04 g (15 mole percent based on the amount of allyl acetate) of pyrazole. The resultant reaction mixture was stirred at ambient temperature under a nitrogen atmosphere for 5 minutes. Then 38 g (2 molar equivalents based on the amount of allyl acetate) of aqueous 35 percent hydrogen peroxide solution as an oxidant was added into the reactor at ambient temperature. An exothermic reaction occurred, and the temperature reached 45° C. Cooling with an ice-water bath was necessary to lower the temperature to 30 to 35° C. The reaction was carried out at 35° C. for about 5 hours. The reaction mixture was analyzed by gas chromatography (GC)/mass spectrometry (MS) for unreacted allyl acetate, for glycidyl acetate and for hydrolyzed epoxy, which is present as a glycol impurity. The conversion of allyl acetate was greater than 75 percent, and the selectivity to glycidyl acetate was greater than 95 percent.

The reaction mixture was extracted with two 100-mL portions of methylene chloride. The methylene chloride extracts were combined and washed with one 50-mL portion of water. The methylene chloride was removed from the reaction mixture using rotary evaporation at 95° C. and 100 mmHg. The crude glycidyl acetate was transferred to a 100 mL, round-bottom flask equipped with a short path distillation apparatus, and 12 g of pure glycidyl acetate was collected upon distillation at 90° C. to 100° C. at less than 15 mmHg. Analysis by GC/MS confirmed the material to be glycidyl acetate.

The procedure of Part A above was repeated three additional times at a scale of 80 g allyl acetate (0.8 mole), and the quantities of glycidyl acetate produced in the four experiments were combined to yield a total of 180 g.

B. Coupling of Glycidyl Acetate with Bisphenol A

Experiment B1

In this part of Example 2, a 50-mL, four-necked, glass reactor equipped with a cooling condenser, a thermometer, a magnetic stirrer, a nitrogen inlet and a heating lamp with thermo-controller was employed. To the reactor were added 5.8 g (0.05 mole) of glycidyl acetate from Part A above, 20 g of tert-amyl alcohol, 0.038 g (1.5 mole percent based on bisphenol A) benzyltrimethylammonium chloride and 1.42 g (0.006 mole) of bisphenol A. The reactor contents were stirred at 85° C. for 8 hours. The crude reaction mixture was analyzed by gas chromatography (GC)/mass spectrometry (MS). The conversion of bisphenol A was greater than 95 percent.

The tert-amyl alcohol and excess glycidyl acetate were removed from the reaction mixture using rotary evaporation at 90° C. and 10 to 15 mmHg yielding a crude bis(α-hydroxy acetate) derivative of bisphenol A. This reaction product was not carried forward in the reaction scheme, but was additionally analyzed by high pressure liquid chromatography (HPLC)/mass spectrometry (MS) and the result of the analysis is shown in Table I below.

TABLE I

HPLC/MS Analysis of Coupling Product from Bisphenol A and Glycidyl Acetate

| Structure Reference No. by Mass | Structure[1] | Area % |
|---|---|---|
| 376 | OH-CH₂-CH(OH)-CH₂-O-C₆H₄-C(CH₃)₂-C₆H₄-O-CH₂-CH(OH)-CH₂-OH | 9 |
| 492a | OH-CH₂-CH(OH)-CH₂-O-C₆H₄-C(CH₃)₂-C₆H₄-O-CH₂-CH(OH)-CH₂-O-CH₂-CH(OH)-CH₂-Ac | |
| 492b | Isomer of 492a | |
| 418 | OH-CH₂-CH(OH)-CH₂-O-C₆H₄-C(CH₃)₂-C₆H₄-O-CH₂-CH(OH)-CH₂-Ac | 34 |
| 460a | Isomer of 460b and 460c | |
| 534 | OH-CH₂-CH(Ac)-CH₂-O-C₆H₄-C(CH₃)₂-C₆H₄-O-CH₂-CH(Ac)-CH₂-O-CH₂-CH(OH)-CH₂-Ac | |
| 576a | Isomer of 576b and 576c | |
| 460b | Ac-CH₂-CH(OH)-CH₂-O-C₆H₄-C(CH₃)₂-C₆H₄-O-CH₂-CH(OH)-CH₂-Ac | 30 |
| 502a | Isomer of 502b, 502c, and 502d | |
| 460c | OH-CH₂-CH(OH)-CH₂-O-C₆H₄-C(CH₃)₂-C₆H₄-O-CH₂-CH(Ac)-CH₂-Ac | 5 |
| 502b | Isomer of 502a, 502c, and 502d | |
| 576b | OH-CH₂-CH(Ac)-CH₂-O-C₆H₄-C(CH₃)₂-C₆H₄-O-CH₂-CH(Ac)-CH₂-O-CH₂-CH(OH)-CH₂-Ac | |
| 576c | OH-CH₂-CH(Ac)-CH₂-O-C₆H₄-C(CH₃)₂-C₆H₄-O-CH₂-CH(OH)-CH₂-O-CH₂-CH(Ac)-CH₂-Ac | |

TABLE I-continued

HPLC/MS Analysis of Coupling Product from Bisphenol A and Glycidyl Acetate

| Structure Reference No. by Mass | Structure[1] | Area % |
|---|---|---|
| 502c | Ac—O—CH₂—CH(OH)—CH₂—O—C₆H₄—C(CH₃)₂—C₆H₄—O—CH₂—CH(Ac)—CH₂—Ac | |
| 502d | Isomer of 502c | |
| 544a | Isomer of 544b | 9 |
| 544b | Ac—CH₂—CH(Ac)—CH₂—O—C₆H₄—C(CH₃)₂—C₆H₄—O—CH₂—CH(Ac)—CH₂—Ac | |

[1]"Ac" in Table I = "OAc"

Experiment B2

In this part of Example 2, a 50-mL, four-necked, glass reactor equipped with a cooling condenser, a thermometer, a magnetic stirrer, a nitrogen inlet and a heating lamp with thermo-controller was employed. To the reactor were added 11.6 g (0.1 mole) of glycidyl acetate from Part A above, 20 g of tert-amyl alcohol, 0.076 g (1.5 mole percent based on bisphenol A) benzyltrimethylammonium chloride and 2.82 g (0.012 mole) of bisphenol A. The reactor contents were stirred at 85° C. for 5 hours. The crude reaction mixture was analyzed by gas chromatography, and the conversion of bisphenol A was greater than 95 percent.

The tert-amyl alcohol and excess glycidyl acetate were removed from the reaction mixture using rotary evaporation at 90° C. and 10 to 15 mmHg yielding 3.1 g of crude bis(α-hydroxy acetate) derivative of bisphenol A.

The procedure of Experiment B2 above reaction was repeated one additional time. The combined crude bis(α-hydroxy acetate) derivative of bisphenol A from the two experiments weighed 6.5 g.

Experiment B3

In this part of Example 2, a 250-mL, four-necked, glass reactor equipped with a cooling condenser, a thermometer, a magnetic stirrer, a nitrogen inlet and a heating lamp with thermo-controller was employed. To the reactor were added 45 g (0.4 mole) of glycidyl acetate from Part A above, 100 g of tert-amyl alcohol, 0.304 g (1.5 mole percent based on bisphenol A) benzyltrimethylammonium chloride and 11.28 g (0.05 mole) of bisphenol A. The reactor contents were stirred at 90° C. to 95° C. for 3.5 hours. The crude reaction mixture was analyzed by gas chromatography, and the conversion of bisphenol A was greater than 95 percent.

The tert-amyl alcohol and excess glycidyl acetate were removed from the reaction mixture using rotary evaporation at 90° C. and 10 to 15 mmHg yielding crude bis(α-hydroxy acetate) derivative of bisphenol A. This reaction product was analyzed by high pressure liquid chromatography (HPLC)/mass spectrometry (MS) and the analysis of the major components is shown in Table II below.

TABLE II

HPLC/MS Analysis of Coupling Product from Bisphenol A and Glycidyl Acetate

| Structure Reference No. by Mass ID (MW)* | Structure | Area % |
|---|---|---|
| 376 &/or 384 | Unknown | |
| 418 &/or 460a | HO—CH₂—CH(OH)—CH₂—O—C₆H₄—C(CH₃)₂—C₆H₄—O—CH₂—CH(OH)—CH₂—Ac &/or AcO—CH₂—CH(OH)—CH₂—O—C₆H₄—C(CH₃)₂—C₆H₄—O—CH₂—CH(OAc)—CH₂—OH | 10.7 |

TABLE II-continued

HPLC/MS Analysis of Coupling
Product from Bisphenol A and Glycidyl Acetate

| Structure Reference No. by Mass ID (MW)* | Structure | Area % |
|---|---|---|
| 460b | 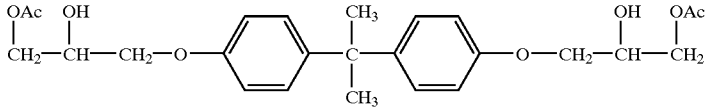 | 31.4 |
| 576 | 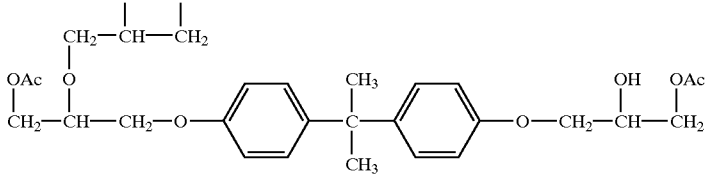 | 6.6 |
| 502a | 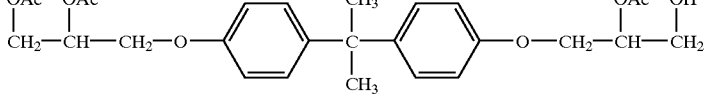 | 1.2 |
| 502b | 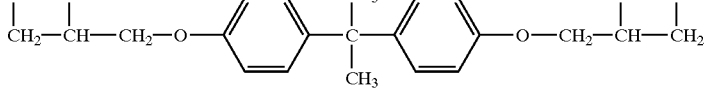 | 32.9 |
| 660a | 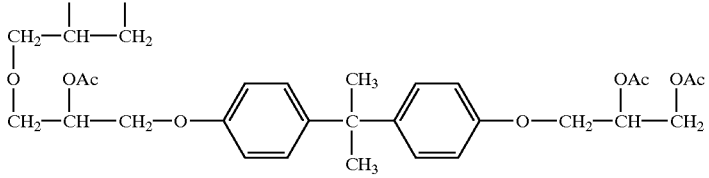 | 0.4 |
| 660b | 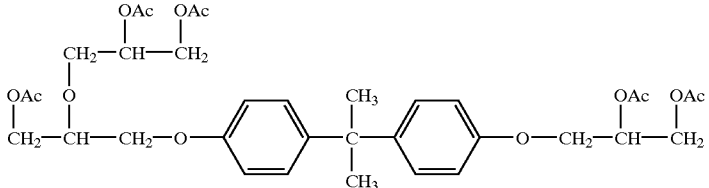 | 8.93 |

*Identification by molecular weight.

C. In Situ Chloride Substitution-Deesterification of Bis(α-Hydroxy Acetate) Derivative of Bisphenol A Experiment C1

In this part of Example 2, a 100-mL, four-necked, glass reactor equipped with a cooling condenser connected to a gas scrubber containing 40 percent KOH, a thermometer, a magnetic stirrer, a fritted glass gas inlet tube and a heating lamp with thermo-controller was employed. To the reactor were added 5 g of crude bis(α-hydroxy acetate) derivative of bisphenol A from Experiment B2 above and 50 g of 1-methoxy 2-hydroxy propane solvent. The mixture was heated to 90° C. to 95° C. HCl gas was slowly bubbled into the mixture for about 3 hours after which time GC analysis showed greater than 95 percent of the bis(α-hydroxy acetate) derivative of bisphenol A was converted into the bis(α-chlorohydrin) intermediate of bisphenol A, the structure of which was confirmed by GC comparison with standard bis(α-chlorohydrin) intermediate of bisphenol A obtained from the conventional coupling of bisphenol A and epichlorohydrin and by GC/MS analysis.

Experiment C2

In this part of Example 2, a 250-mL, four-necked, glass reactor equipped with a cooling condenser connected to a gas scrubber containing 40 percent KOH, a thermometer, a magnetic stirrer, a fritted glass gas inlet tube and a heating lamp with thermo-controller was employed. To the reactor were added the crude α-hydroxy acetate derivative of bisphenol A from Part B3 above and 100 g 1-methoxy-2-hydroxypropane. The mixture was heated to 90° C. to 95° C. HCl gas was slowly bubbled into the mixture for about 3 hours after which time GC analysis showed greater than 95 percent of the bis(α-hydroxy acetate) derivative of bisphenol A was converted into the bis(α-chlorohydrin) derivative of bisphenol A. This reaction product was analyzed by high pressure liquid chromatography (HPLC)/mass spectrometry (MS) and the analysis of the major components is shown in Table III below.

additional 30 minutes in order to neutralize unreacted HCl dissolved in the mixture.

After removing the precipitated salt by filtration, the resultant solution was transferred into another 250-mL, four-necked, glass reactor equipped with a cooling condenser, a thermometer, a magnetic stirrer, an addition funnel for liquids and a heating lamp with a thermo-controller. The reaction mixture was heated to 50 to 52° C. Using the addition funnel, 12 g of 50 percent aqueous NaOH solution (0.15 mole of NaOH) was added slowly to the heated mixture over a period of 60 minutes at 50° C. to 52° C., after which time the mixture was allowed to react for about an additional 60 minutes at 50° C. to 52° C. GC analysis of the resultant product indicated that greater than 90 percent of the bis(α-chlorohydrin) derivative was converted into bisphenol A diglycidyl ether as identified by GC elution time comparison with an authentic commercial

TABLE III

HPLC/MS Analysis of Chloride Substitution-Deesterification Product of Bisphenol A and Glycidyl Acetate Coupling Product.

| Structure Reference by Mass | Structure | Area % |
|---|---|---|
| 394 | Cl-CH$_2$-CH(OH)-CH$_2$-O-C$_6$H$_4$-C(CH$_3$)$_2$-C$_6$H$_4$-O-CH$_2$-CH(OH)-CH$_2$(OH) | 28.4 |
| 486 | Cl-CH$_2$-CH(OH)-CH$_2$-O-C$_6$H$_4$-C(CH$_3$)$_2$-C$_6$H$_4$-O-CH$_2$-CH(OH)-CH$_2$-O-CH$_2$-CH(OH)-CH$_2$Cl | 1.5 |
| 520 | Unknown | 4.8 |
| 412 | Cl-CH$_2$-CH(OH)-CH$_2$-O-C$_6$H$_4$-C(CH$_3$)$_2$-C$_6$H$_4$-O-CH$_2$-CH(OH)-CH$_2$Cl | 47.0 |
| 454 | Cl-CH$_2$-CH(OAc)-CH$_2$-O-C$_6$H$_4$-C(CH$_3$)$_2$-C$_6$H$_4$-O-CH$_2$-CH(OH)-CH$_2$Cl | 1.3 |

*Identification by molecular weight.

In this part of Example 2, a 250-mL, four-necked, glass reactor equipped with a cooling condenser, a thermometer, a magnetic stirrer, an addition funnel for liquids and a heating lamp with a thermo-controller was employed. Into the reactor was transferred the crude bis(α-chlorohydrin) derivative of bisphenol A prepared in Experiment C2 above. To the reactor was also added 100 g of 1-methoxy-2-hydroxypropane as solvent. At ambient temperature, 12 g of 50 percent aqueous NaOH solution (0.15 mole of NaOH) was added slowly to the mixture over a period of 30 minutes, after which the mixture was allowed to react for about an sample. The epoxy product was dissolved into 150 mL methyl ethyl ketone/toluene (50/50 volume) and was washed twice with 50 mL portions of water. The organic phase was separated and concentrated by rotary evaporation at 90° C. to 95° C. and less than 15 mmHg, yielding 13 g of epoxy resin having an epoxy content of 20.55 percent and an epoxy equivalent weight of 209. This reaction product was analyzed by high pressure liquid chromatography (HPLC)/mass spectrometry (MS) and the analysis of the major components is shown in Table IV below.

TABLE IV

HPLC/MS Analysis of Epoxidation Product of Chloride Substitution-Deesterification Product of Bisphenol A and Glycidyl Acetate Coupling Product

| Structure Reference No. by Mass ID (MW)* | Structure | Area % |
|---|---|---|
| 394 | Cl-CH$_2$-CH(OH)-CH$_2$-O-C$_6$H$_4$-C(CH$_3$)$_2$-C$_6$H$_4$-O-CH$_2$-CH(OH)-CH$_2$-OH | 1.94% |
| 358 | epoxide-CH$_2$-O-C$_6$H$_4$-C(CH$_3$)$_2$-C$_6$H$_4$-O-CH$_2$-CH(OH)-CH$_2$-OH | 9.32% |
| 414a or 414b | epoxide-CH$_2$-O-C$_6$H$_4$-C(CH$_3$)$_2$-C$_6$H$_4$-O-CH$_2$-CH(OH)-CH$_2$-O-CH$_2$-CH(OH)-CH$_2$-OH; CH$_2$=O-CH(CH$_3$)-CH$_2$-O-CH$_2$-CH(OH)-CH$_2$-O-C$_6$H$_4$-C(CH$_3$)$_2$-C$_6$H$_4$-O-CH$_2$-CH=CH$_2$ | 2.06% |
| 400 | epoxide-CH$_2$-O-C$_6$H$_4$-C(CH$_3$)$_2$-C$_6$H$_4$-O-CH$_2$-CH(OH)-CH$_2$-OAc | 2.20% |
| 412 | unknown | 2.67% |
| 376a | epoxide-CH$_2$-O-C$_6$H$_4$-C(CH$_3$)$_2$-C$_6$H$_4$-O-CH$_2$-CH(Cl)-CH$_2$-OH | 3.60% |
| 376b | epoxide-CH$_2$-O-C$_6$H$_4$-C(CH$_3$)$_2$-C$_6$H$_4$-O-CH$_2$-CH(OH)-CH$_2$-Cl | 3.70% |
| 340 | epoxide-CH$_2$-O-C$_6$H$_4$-C(CH$_3$)$_2$-C$_6$H$_4$-O-CH$_2$-CH-CH$_2$-epoxide | 67.90% |
| 374 | unknown | 0.21% |
| 418 | Cl-CH$_2$-CH(OAc)-CH$_2$-O-C$_6$H$_4$-C(CH$_3$)$_2$-C$_6$H$_4$-O-CH$_2$-CH-CH$_2$-epoxide | 0.51% |

*Identification by molecular weight.

HPLC analysis shows the major component is diglycidyl ether of bisphenol A.

What is claimed is:

1. A process for making an epoxy resin comprising converting an α-hydroxy ester derivative of at least one or more phenols to an epoxy resin.

2. A process for making an epoxy resin comprising (a) converting at least one or more phenols to an α-hydroxy ester derivative by reacting the at least one or more phenols with a glycidyl ester or substituted glycidyl ester and (b) converting the α-hydroxy ester derivative of the at least one or more phenols to an epoxy resin.

3. A process of making an epoxy resin comprising (a) converting an α-hydroxy ester derivative of at least one or more phenols to an α-halohydrin intermediate of at least one or more phenols and (b) converting the α-halohydrin intermediate of at least one or more phenols to an epoxy resin.

4. A process of making an epoxy resin comprising (a) reaction of the α-hydroxy ester derivative of at least one or more phenols with a hydrogen halide to form an α-halohydrin intermediate of at least one or more phenols and (b) epoxidizing the α-halohydrin intermediate of at least one or more phenols to form an epoxy resin.

5. The process of claim 3 or 4 wherein the α-halohydrin intermediate of at least one or more phenols comprises a structure having the following Formula I:

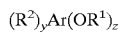  Formula I wherein y is from 0 to 750, z is from 1 to 150, Ar is an aromatic-containing moiety, $R^1$ is an α-halohydrin propyl-containing moiety and $R^2$ is a group substituted for a hydrogen atom on the Ar moiety.

6. The process of claim 5 wherein the α-halohydrin intermediate of at least one or more phenols comprises a structure represented by any one or more of the following Formulas II-V:

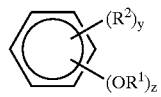  Formula II wherein y is 0 to 5; z is 1 to 4; $R^1$ is an α-halohydrin propyl-containing moiety; and $R^2$ is a group substituted for a hydrogen atom on the Ar moiety;

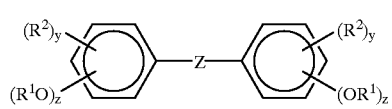  Formula III wherein y is 0 to 4, and each y can be the same or different; z is 1 to 3, and each z can be the same or different; $R^1$ is an α-halohydrin propyl-containing moiety; $R^2$ is a group substituted for a hydrogen atom on the aromatic ring; and Z is (i) nil, (ii) a heteroatom with or without substituents thereon to complete its necessary bonding valence, (iii) —C(O)—, (iv) —S($O_2$)—, (v) —C(O)NH—, (vi) —P(O)Ar—, (vii) an organic aliphatic or cycloaliphatic moiety, saturated or unsaturated, with or without heteroatoms, or (viii) a partially or fully fluorinated organic aliphatic or cycloaliphatic moiety;

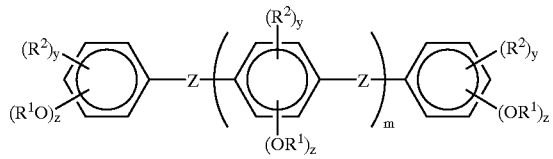  Formula IV wherein y is 0 to 4, and each y can be the same or different; z is 1 to 3, and each z can be the same or different; $R^1$ is an α-halohydrin propyl-containing moiety; $R^2$ is a group substituted for a hydrogen atom on the aromatic ring; Z is (i) nil, (ii) a heteroatom with or without substituents thereon to complete its necessary bonding valence, (iii) —C(O)—, (iv) —S($O_2$)—, (v) —C(O)NH—, (vi) —P(O)Ar—, (vii) an organic aliphatic or cycloaliphatic moiety, saturated or unsaturated, with or without heteroatoms, or (viii) a partially or fully fluorinated organic aliphatic or cycloaliphatic moiety; and m is from 0.001 to 10; or

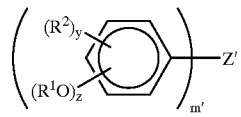  Formula V wherein y is 0 to 4, and each y can be the same or different; z is 1 to 3, and each z can be the same or different; $R^1$ is an α-halohydrin propyl-containing moiety; $R^2$ is a group substituted for a hydrogen atom on the aromatic ring; Z' is (i) an organic aliphatic moiety, saturated or unsaturated, with or without heteroatoms, wherein the aliphatic moiety has from 1 to 20 carbon atoms, (ii) a cycloaliphatic moiety, saturated or unsaturated, with or without heteroatoms, having from 3 to 20 carbon atoms, (iii) an aromatic moiety, with or without heteroatoms, having 6 to 20 carbon atoms, (iv) a partially or fully fluorinated organic aliphatic, cycloaliphatic or aromatic moiety, (v) or any combination thereof; and m' is 3 or 4.

7. The process of claim 6 wherein $R^1$ is selected from:

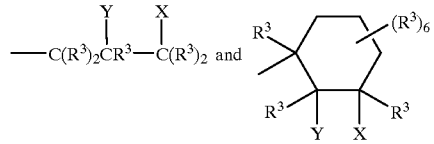

wherein X and Y may be a halogen atom or hydroxyl group with the proviso that when X is a halogen Y must be a hydroxyl and when Y is a halogen X must be a hydroxyl; and $R^3$ is hydrogen, an alkyl group having from 1 to 20 carbon atoms, a cycloaliphatic group having from 3 to 20 carbon atoms, an aromatic group having from 6 to 20 carbon atoms or any combination thereof.

8. The process of claim 7 wherein $R^1$ is selected from:

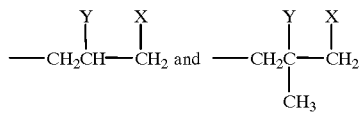

wherein X and Y may be a halogen atom or hydroxyl group with the proviso that when X is a halogen Y must be a hydroxyl and when Y is a halogen X must be a hydroxyl.

9. The process of claim 6 wherein the α-halohydrin intermediate of at least one or more phenols is an α-chlorohydrin intermediate selected from the group comprising 1,3-dihydroxybenzene bis(3-chloro-2-hydroxypropyl) ether; 1,4-dihydroxybenzene bis(3-chloro-2-hydroxypropyl) ether; 1,5-dihydroxynaphthalene bis(3-chloro-2-hydroxypropyl) ether; 2,6-dihydroxy-naphthalene bis(3-chloro-2-hydroxypropyl) ether; 4,4'-dihydroxybiphenyl bis(3-chloro-2-hydroxypropyl) ether; 3,3',5,5'-tetramethyl-4,4'-dihydroxybiphenyl bis(3-chloro-2-hydroxypropyl) ether; 3,3',5,5'-tetramethyl-2,2',6,6'-tetrabromo-4,4'-dihydroxybiphenyl bis(3-chloro-2-hydroxypropyl) ether; bis(4-hydroxyphenyl)methane bis(3- chloro-2-hydroxypropyl) ether; 2,2-bis(4-hydroxyphenyl) isopropylidene-bis(3-chloro-2-hydroxypropyl) ether; phenol-formaldehyde novolac (3-chloro-2-hydroxypropyl) ether(functionality greater than 2); o-cresol-formaldehyde novolac (3-chloro-2-hydroxypropyl) ether (functionality greater than 2); phenol-dicyclopentadienyl novolac (3-chloro-2-hydroxypropyl) ether (functionality greater than 2); naphthol-formaldehyde novolac (3-chloro-2-hydroxypropyl) ether (functionality greater than 2); 1,1,1-tris(4-hydroxyphenyl)methane tris(3-chloro-2-hydroxypropyl) ether; 1,1,2,2-tetrakis(4-hydroxyphenyl) ethane tetrakis(3-chloro-2-hydroxypropyl) ether; 1,3-dihydroxybenzene bis(2-chloro-3-hydroxypropyl) ether; 1,4-dihydroxybenzene bis(2-chloro-3-hydroxypropyl) ether; 1,5-dihydroxynaphthalene bis(2-chloro-3-hydroxypropyl) ether; 2,6-dihydroxy-naphthalene bis(2-chloro-3-hydroxypropyl) ether; 4,4'-dihydroxybiphenyl bis(2-chloro-3-hydroxypropyl) ether; 3,3',5,5'-tetramethyl-4,4'-dihydroxybiphenyl bis(2-chloro-3-hydroxypropyl) ether; 3,3',5,5'-tetramethyl-2,2',6,6'-tetrabromo-4,4'-dihydroxybiphenyl bis(2-chloro-3-hydroxypropyl) ether; bis (4-hydroxyphenyl)methane bis(2-chloro-3-hydroxypropyl) ether; 2,2-bis(4-hydroxyphenyl)isopropylidene bis(2-chloro-3-hydroxypropyl) ether; phenol-formaldehyde novolac (2-chloro-3-hydroxypropyl) ether (functionality greater than 2); o-cresol-formaldehyde novolac (2-chloro-3-hydroxypropyl) ether (functionality greater than 2); phenol-dicyclopentadienyl novolac (2-chloro-3-hydroxypropyl) ether (functionality greater than 2); naphthol-formaldehyde novolac (2-chloro-3-hydroxypropyl) ether (functionality greater than 2); 1,1,1-tris(4-hydroxyphenyl)methane tris(2-chloro-3-hydroxypropyl) ether; 1,1,2,2-tetrakis(4-hydroxyphenyl) ethane tetrakis(2-chloro-3-hydroxypropyl) ether; and mixtures thereof.

10. The process of claim 9 wherein the α-chlorohydrin intermediate of at least one or more phenols is selected from the group comprising 2,2-bis(4-hydroxyphenyl) isopropylidene bis(3-chloro-2-hydroxypropyl) ether; 2,2-bis (4-hydroxyphenyl)isopropylidene bis(2-chloro-3-hydroxypropyl) ether; and mixtures thereof.

11. The process as in any one of claims 1–4 wherein the α-hydroxy ester derivative of at least one or more phenols, comprises a structure represented by the following Formula VI:

$(R^2)_y Ar(OR^{1'})_z$  Formula VI wherein y is from 0 to 750; z is from 1 to 150; Ar is an aromatic-containing moiety; $R^{1'}$ is an α-hydroxy ester propyl-containing moiety; and $R^2$ is a group substituted for a hydrogen atom on the Ar moiety.

12. The process of claim 11 wherein the α-hydroxy ester derivative of at least one or more phenols, comprises a structure represented by any one or more of Formulas VII–X as follows:

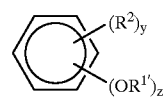

Formula VII wherein y is 0 to 5; z is 1 to 4; $R^{1'}$ is an α-hydroxy ester propyl-containing moiety; and $R^2$ is a group substituted for a hydrogen atom on the aromatic ring;

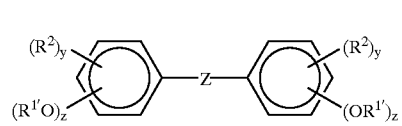

Formula VIII wherein y is 0 to 4, and each y can be the same or different; z is 1 to 3, and each z can be the same or different; $R^{1'}$ is an α-hydroxy ester propyl-containing moiety; $R^2$ is a group substituted for a hydrogen atom on the aromatic ring; and Z is (i) nil, (ii) a heteroatom with or without substituents thereon to complete its necessary bonding valence, (iii) —C(O)—, (iv) —S(O$_2$)—, (v) —C(O)NH—, (vi) —P(O) Ar—, (vii) an organic aliphatic or cycloaliphatic moiety, saturated or unsaturated, with or without heteroatoms, or (viii) a partially or fully fluorinated organic aliphatic or cycloaliphatic moiety;

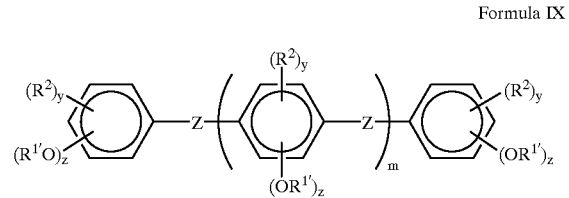

Formula IX wherein y is 0 to 4, and each y can be the same or different; z is 1 to 3, and each z can be the same or different; $R^{1'}$ is an α-hydroxy ester propyl-containing moiety; $R^2$ is a group substituted for a hydrogen atom on the aromatic ring; Z is (i) nil, (ii) a heteroatom with or without substituents thereon to complete its necessary bonding valence, (iii) —C(O(iv) —S(O$_2$)—, (v) —C(O)NH—, (vi) —P(O)Ar—, (vii) an organic aliphatic or cycloaliphatic moiety, saturated or unsaturated with or without heteroatoms, or (viii) a partially or fully fluorinated organic aliphatic or cycloaliphatic moiety; and m is from 0.001 to 10; or

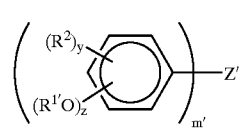

Formula X wherein y is 0 to 4, and each y can be the same or different; z is 1 to 3, and each z can be the same or different; $R^{1'}$ is an α-hydroxy ester propyl-containing moiety; $R^2$ is a group substituted for a hydrogen atom on the aromatic ring; Z' is (i) an organic aliphatic moiety, saturated or unsaturated, with or without heteroatoms, wherein the aliphatic moiety has from 1 to 20 carbon atoms, (ii) a cycloaliphatic moiety, saturated or unsaturated, with or without heteroatoms, having from 3 to 20 carbon atoms, (iii) an aromatic moiety, with or without heteroatoms, having 6 to 20 carbon atoms, (iv) a partially or fully fluorinated organic aliphatic, cycloaliphatic or aromatic moiety, or (v) any combination thereof; and m' is 3 or 4.

13. The process of claim 12 wherein $R^{1'}$ is selected from:

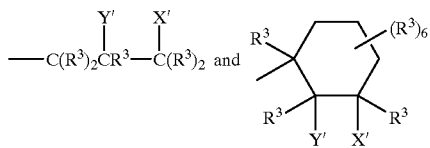

wherein X' and Y' may be a hydroxyl group or a carboxylic acid ester moiety, with the proviso that when X' is a hydroxyl group Y' must be a carboxylic acid ester moiety and when Y' is a hydroxyl group X' must be a carboxylic acid ester moiety; and $R^3$ is hydrogen, an alkyl group having from 1 to 20 carbon atoms, a cycloaliphatic group having from 3 to 20 carbon atoms, an aromatic group having from 6 to 20 carbon atoms or any combination thereof.

14. The process of claim 13 wherein $R^{1'}$ is selected from:

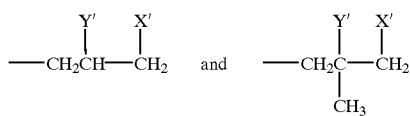

wherein X' and Y' may be a hydroxyl group or a carboxylic acid ester moiety, with the proviso that when X' is a hydroxyl group Y' must be a carboxylic acid ester moiety and when Y' is a hydroxyl group X' must be a carboxylic acid ester moiety.

15. The process of claim 14 wherein the carboxylic acid ester moiety has the following general structure:

wherein $R^4$ is hydrogen, an alkyl group having from 1 to 20 carbon atoms, an alkenyl group having from 2 to 20 carbon atoms, a cycloaliphatic group having from 3 to 20 carbon atoms, or an aromatic group having from 6 to 20 carbon atoms.

16. The process of claim 15 wherein the $R^4$ is a methyl group.

17. The process of claim 12 wherein the α-hydroxy ester derivative of phenols or mixtures of phenols is selected from the group comprising 1,3-dihydroxybenzene bis(3-acetoxy-2-hydroxypropyl) ether; 1,4-dihydroxybenzene bis(3-acetoxy-2-hydroxypropyl) ether; 1,5-dihydroxynaphthalene bis(3-acetoxy-2-hydroxypropyl) ether; 2,6-dihydroxynaphthalene bis(3-acetoxy-2-hydroxypropyl) ether; 4,4'-dihydroxybiphenyl bis(3-acetoxy-2-hydroxypropyl) ether; 3,3',5,5'-tetramethyl-4,4'-dihydroxybiphenyl bis(3-acetoxy-2-hydroxypropyl) ether; 3,3',5,5'-tetramethyl-2,2',6,6'-tetrabromo-4,4'-dihydroxybiphenyl bis(3-acetoxy-2-hydroxypropyl) ether; bis(4-hydroxyphenyl)methane bis(3-acetoxy-2-hydroxypropyl) ether; 2,2-bis(4-hydroxyphenyl)isopropylidene di(3-acetoxy-2-hydroxypropyl) ether; phenol-formaldehyde novolac (3-acetoxy-2-hydroxypropyl) ether (functionality greater than 2); o-cresol-formaldehyde novolac (3-acetoxy-2-hydroxypropyl) ether (functionality greater than 2); phenol-dicyclopentadienyl novolac (3-acetoxy-2-hydroxypropyl) ether (functionality greater than 2); naphthol-formaldehyde novolac (3-acetoxy-2-hydroxypropyl) ether (functionality greater than 2); 1,1,1-tris(4-hydroxyphenyl)methane tris(3-acetoxy-2-hydroxypropyl) ether; 1,1,2,2-tetrakis(4-hydroxyphenyl)ethane tetrakis (3-acetoxy-2-hydroxypropyl) ether; 1,3-dihydroxybenzene bis(2-acetoxy-3-hydroxypropyl) ether; 1,4-dihydroxybenzene bis(2-acetoxy-3-hydroxypropyl) ether; 1,5-dihydroxynaphthalene bis(2-acetoxy-3-hydroxypropyl) ether; 2,6-dihydroxynaphthalene bis(2-acetoxy-3-hydroxypropyl) ether; 4,4'-dihydroxybiphenyl bis(2-acetoxy-3-hydroxypropyl) ether; 3,3',5,5'-tetramethyl-4,4'-dihydroxybiphenyl bis(2-acetoxy-3-hydroxypropyl) ether; 3,3',5,5'-tetramethyl-2,2',6,6'-tetrabromo-4,4'-dihydroxybiphenyl bis(2-acetoxy-3-hydroxypropyl) ether; bis(4-hydroxyphenyl)methane bis(2-acetoxy-3-hydroxypropyl) ether; 2,2-bis(4-hydroxyphenyl)isopropylidene bis(2-acetoxy-3-hydroxypropyl) ether; phenol-formaldehyde novolac (2-acetoxy-3-hydroxypropyl) ether (functionality greater than 2); o-cresol-formaldehyde novolac (2-acetoxy-3-hydroxypropyl) ether (functionality greater than 2); phenol-dicyclopentadienyl novolac (2-acetoxy-3-hydroxypropyl) ether (functionality greater than 2); naphthol-formaldehyde novolac (2-acetoxy-3-hydroxypropyl) ether (functionality greater than 2); 1,1,1-tris(4-hydroxyphenyl)methane tris(2-acetoxy-3-hydroxypropyl) ether; 1,1,2,2-tetrakis(4-hydroxyphenyl)ethane tetrakis(2-acetoxy-3-hydroxypropyl) ether; and mixtures thereof.

18. The process of claim 17 wherein the α-hydroxy ester derivative of phenols or mixtures of phenols is selected from the group comprising 2,2-bis(4-hydroxyphenyl)isopropylidene bis(3-acetoxy-2-hydroxypropyl) ether; 2,2-bis(4-hydroxyphenyl)isopropylidene bis(2-acetoxy-3-hydroxypropyl) ether; and mixtures thereof.

19. The process of claim 11 wherein the α-hydroxy ester derivative of at least one or more phenols, (Component (A)), is a single component represented by any one of Formulas VI–X or a mixture of two or more components wherein at least one of the components in the mixture comprises a structure represented by any one of Formulas VI–X.

20. The process of claim 19 wherein the α-hydroxy ester propyl-containing moiety is selected from:

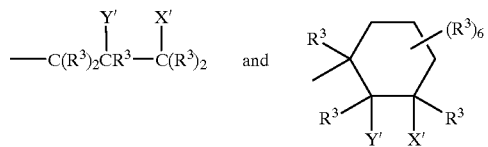

wherein X' and Y' may be a hydroxyl group or a carboxylic acid ester moiety, with the proviso that when X' is a hydroxyl group Y' must be a carboxylic acid ester moiety and when Y' is a hydroxyl group X' must be a carboxylic acid ester moiety; and $R^3$ is hydrogen, an alkyl group having from 1 to 20 carbon atoms, a cycloaliphatic group having from 3 to 20 carbon atoms, an aromatic group having from 6 to 20 carbon atoms or any combination thereof.

21. The process of claim 19 wherein Component (A), the α-hydroxy ester derivative of at least one or more phenols, is a mixture comprising (i) a component having an α-hydroxy ester moiety wherein X' and Y' may be a hydroxyl group or a carboxylic acid ester moiety, with the proviso that when X' is a hydroxyl group Y' must be a carboxylic acid ester moiety and when Y' is a hydroxyl group X' must be a carboxylic acid ester moiety, (ii) a component having an α-diester moiety wherein X' and Y' are both carboxylic acid ester moieties, and (iii) a component having an α-glycol moiety wherein X' and Y' are both hydroxyl.

22. The process of claim 21 wherein the percentages of α-hydroxy ester moieties, α-diester moieties and α-glycol moieties in Component (A) are 5 to 100 percent, 0 to 95 percent and 0 to 95 percent, respectively.

23. The process of claim 22 wherein the percentages of α-hydroxy ester moieties, α-diester moieties and α-glycol moieties in Component (A) are 15 to 100 percent, 0 to 85 percent and 0 to 85 percent, respectively.

24. The process of claim 23 wherein the percentages of α-hydroxy ester moieties, α-diester moieties and α-glycol moieties in Component (A) are 30 to 100 percent, 0 to 70 percent and 0 to 70 percent, respectively.

25. The process of claim 4 wherein the hydrogen halide is hydrogen chloride.

26. The process of claims 25 wherein the amount of the hydrogen halide is from about 0.5 mole to about 20 moles of hydrogen halide relative to the equivalents of α-hydroxy ester moieties being reacted in the α-hydroxy ester derivative.

27. The process of claim 4 wherein step (a) is carried out at a temperature of from about 0° C. to about 150° C.

28. The process of claim 4 wherein step (a) is carried out in the presence of a solvent.

29. The process of claim 28 wherein the solvent is selected from the group consisting of aliphatic hydrocarbon solvents, cyclic hydrocarbon solvents, aromatic hydrocarbon solvents, chlorinated solvents, aprotic solvents, protic solvents, partially or fully fluorinated solvents and mixtures thereof.

30. The process of claim 29 wherein the solvent is an alcohol, a chlorinated solvent or mixtures thereof.

31. The process as in any one of claims 1–4 wherein the α-hydroxy ester derivative of at least one or more phenols, is prepared by reacting (1) at least one or more phenols with (2) a glycidyl ester or a substituted glycidyl ester.

32. The process of claim 31 wherein Component (1), the one or more phenols, comprises a structure represented by the following Formula XI:

Formula XI wherein y is 0 to 750; z is 1 to 150; Ar is an aromatic-containing moiety; and $R^2$ is a group substituted for a hydrogen atom on the Ar moiety.

33. The process of claim 32 wherein Component (1), the one or more phenols, comprises a structure represented by any one or more of Formulas XII–XV as follows:

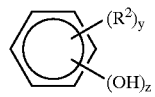
Formula XII wherein y is 0 to 5; z is 1 to 4; and $R^2$ is a group substituted for a hydrogen atom on the aromatic ring;

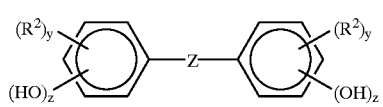
Formula XIII wherein y is 0 to 4, and each Y can be the same or different; z is 1 to 3, and each z can be the same or different; $R^2$ is a group substituted for a hydrogen atom on the aromatic ring; and Z is (i) nil, (ii) a heteroatom with or without substituents thereon to complete its necessary bonding valence, (iii) —C(O)—, (iv) —S(O$_2$)—, (v) —C(O)NH—, (vi) —P(O)Ar—, (vii) an organic aliphatic or cycloaliphatic moiety, saturated or unsaturated, with or without heteroatoms, or (viii) a partially or fully fluorinated organic, aliphatic or cycloaliphatic moiety;

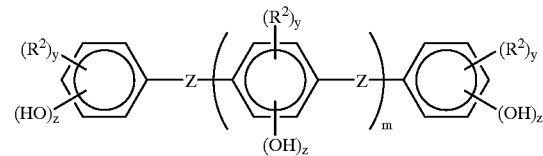
Formula XIV wherein y is 0 to 4, and each y can be the same or different; z is 1 to 3, and each z can be the same or different; $R^2$ is a group substituted for a hydrogen atom on the aromatic ring; Z is (i) nil, (ii) a heteroatom with or without substituents thereon to complete its necessary bonding valence, (iii) —C(O)—, (iv) —S(O$_2$)—, (v) —C(O)NH—, (vi) —P(O)Ar—, (vii) an organic aliphatic or cycloaliphatic moiety, saturated or unsaturated, with or without heteroatoms, or (viii) a partially or fully fluorinated organic aliphatic or cycloaliphatic moiety; and m is from 0.001 to 10; or

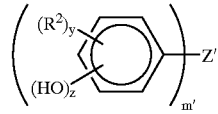
Formula XV wherein y is 0 to 4, and each Y can be the same or different; z is 1 to 3, and each z can be the same or different; $R^2$ is a group substituted for a hydrogen atom on the aromatic ring; Z' is (i) an organic aliphatic moiety, saturated or unsaturated, with or without heteroatoms, wherein the aliphatic moiety has from 1 to 20 carbon atoms, (ii) a cycloaliphatic moiety, saturated or unsaturated, with or without heteroatoms, having from 3 to 20 carbon atoms, (iii) an aromatic moiety, with or without heteroatoms, having 6 to 20 carbon atoms, (iv) a partially or fully fluorinated organic aliphatic, cycloaliphatic or aromatic moiety, (v) or any combination thereof; and m' is 3 or 4.

34. The process of claim 31 wherein Component (2), the glycidyl ester, is represented by the following Formula XVI:

Formula XVI wherein $R^4$ is hydrogen, an alkyl group having from 1 to 20 carbon atoms, an alkenyl group having from 2 to 20 carbon atoms, a cycloaliphatic group having from 3 to 20 carbon atoms, or an aromatic group having from 6 to 20 carbon atoms; and $R^5$ is a glycidyl moiety selected from the group consisting of:

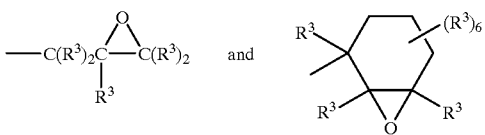

wherein $R^3$ is hydrogen, an alkyl group having from 1 to 20 carbon atoms, a cycloaliphatic group having from 3 to 20 carbon atoms, an aromatic group having from 6 to 20 carbon atoms, or any combination thereof.

35. The process of claim 34 wherein $R^5$ is selected from:

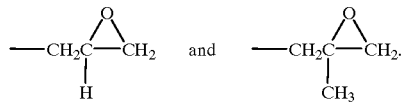

36. The process of claim 35 wherein Component (2), the glycidyl ester, is selected from glycidyl formate, glycidyl acetate, methylglycidyl formate and methylglycidyl acetate.

37. The process of claim 36 wherein Component (2), the glycidyl ester, is glycidyl acetate.

38. The process of claim 31 wherein the amount of glycidyl ester reacted with at least one or more phenols is from about 0.5 equivalents to about 50 equivalents of glycidyl ester per one equivalent of phenolic hydroxyl.

39. The process of claim 31 wherein the reaction of preparing the α-hydroxy ester derivative of at least one or more phenols, is carried out in the presence of a solvent.

40. The process of claim 31 wherein the reaction of preparing the α-hydroxy ester derivative of at least one or more phenols, is carried out in the presence of a catalyst.

41. The process of claim 40 wherein the catalyst is a phase transfer catalyst.

42. The process of claim 41 wherein the catalyst is an organopnicogen-containing catalyst.

43. The process of claim 41 wherein the catalyst is homogeneous or heterogeneous.

44. The process of claim 43 wherein the catalyst is from about 0.001 percent to about 1000 percent by weight based on the amount of the phenol or mixture of phenols used in the reaction.

45. The process of claim 31 wherein the reaction of preparing the α-hydroxy ester derivative of at least one or more phenols, is carried out at a temperature of from about 10° C. to about 160° C.

46. A process for manufacturing an epoxy resin comprising epoxidizing an α-halohydrin intermediate prepared by forming an α-hydroxy ester derivative of at least one or more phenols via the reaction of at least one or more phenols with a glycidyl ester or substituted glycidyl ester, and reacting it with a hydrogen halide.

47. A process for manufacturing an epoxy resin comprising the steps of:
(a) preparing an α-hydroxy ester derivative of at least one or more phenols by reacting at least one or more phenols with a glycidyl ester or substituted glycidyl ester;
(b) preparing an α-halohydrin intermediate by forming an α-hydroxy ester derivative of at least one or more phenols via the reaction of at least one or more phenols with a glycidyl ester or substituted glycidyl ester, and reacting it with a hydrogen halide; and
(c) epoxidizing the α-halohydrin intermediate of Step (b).

48. The process of claim 47 wherein the glycidyl ester or substituted glycidyl ester is prepared by esterifying glycidol or a substituted glycidol with a carboxylic acid or a carboxylic acid halide.

49. The process of claim 47 wherein the glycidyl ester or substituted glycidyl ester is prepared by epoxidation of an allyl ester or a substituted allyl ester of a carboxylic acid.

50. A process for manufacturing an epoxy resin comprising the steps of:
(a) providing a glycidyl ester or substituted glycidyl ester of a carboxylic acid;
(b) preparing an α-hydroxy ester derivative of at least one or more phenols by reacting at least one or more phenols with the glycidyl ester or substituted glycidyl ester of Step (a);
(c) preparing an α-halohydrin intermediate as in claim 3 or 4; and
(d) epoxidizing the α-halohydrin intermediate of Step (c).

51. A process for manufacturing an epoxy resin comprising the steps of:
(a) providing an allyl ester or a substituted allyl ester of a carboxylic acid;
(b) preparing a glycidyl ester or a substituted glycidyl ester by epoxidizing the allyl ester or a substituted allyl ester of Step (a) with an oxidant;
(c) preparing an α-hydroxy ester derivative of at least one or more phenols by reacting at least one or more phenols with the glycidyl ester or a substituted glycidyl ester of Step (b);
(d) preparing an α-halohydrin intermediate by forming an α-hydroxy ester derivative of at least one or more phenols via the reaction of at least one or more phenols with a glycidyl ester or substituted glycidyl ester, and reacting it with a hydrogen halide; and
(e) epoxidizing the α-halohydrin intermediate of Step (d) to form an epoxy resin product.

52. A process for manufacturing an epoxy resin comprising the steps of:
(a) providing allyl acetate;
(b) preparing glycidyl acetate by epoxidizing the allyl acetate of Step (a) with an oxidant;
(c) preparing a bis(α-hydroxy acetoxy) derivative of bisphenol A by reacting bisphenol A with the glycidyl acetate of Step (b);
(d) preparing a bis(α-chlorohydrin) intermediate of bisphenol A by reacting the bis(α-hydroxy acetoxy) derivative of bisphenol A of Step (c) with hydrogen chloride; and
(e) epoxidizing the bis(α-chlorohydrin) intermediate of bisphenol A of Step (d) to form an epoxy resin product.

* * * * *